United States Patent [19]
Noël

[11] Patent Number: 4,755,408
[45] Date of Patent: Jul. 5, 1988

[54] FOAM PANELS AND BLOCKS OF HOLLOW PROFILES

[75] Inventor: Gert Noël, Hauset, Belgium

[73] Assignee: Noel, Marquet & Cie. S.A., Fed. Rep. of Germany

[21] Appl. No.: 931,236

[22] Filed: Nov. 17, 1986

[30] Foreign Application Priority Data

Nov. 19, 1985 [DE] Fed. Rep. of Germany ....... 3541052

[51] Int. Cl.⁴ .......................... E04C 1/08; E04C 2/44; B32B 3/20
[52] U.S. Cl. ..................................... 428/36; 428/159; 428/166; 428/188; 428/316.6
[58] Field of Search ................... 264/45.5, 46.1, 46.3, 264/512, 514, 515; 428/116, 36, 179, 188, 71, 76, 166, 174, 178, 159, 160, 304.4, 316.6; 52/309.4, 309.8, 309.9

[56] References Cited

U.S. PATENT DOCUMENTS

| | | | |
|---|---|---|---|
| 2,369,006 | 2/1945 | Banks | 428/116 |
| 2,994,327 | 8/1961 | Otto et al. | 428/319.9 |
| 3,297,189 | 1/1967 | Carrasse | 428/116 |
| 3,890,416 | 6/1975 | Bauer et al. | 264/46.1 |
| 4,435,463 | 3/1984 | Roellchen | 428/188 |
| 4,618,517 | 10/1986 | Simks, Jr. | 428/188 |

FOREIGN PATENT DOCUMENTS 57-58291 12/1982 Japan ................................ 264/46.1

*Primary Examiner*—William J. Van Balen
*Attorney, Agent, or Firm*—Larson and Taylor

[57] ABSTRACT

According to the present invention, novel foam panels and blocks are provided which are produced by welding and/or adhering foam tubes to one another. The foam panels are used particularly as insulating and/or drainage panels, and the foam blocks are used for the production of super lightweight panels the cavities of which are optionally filled with gypsum, cement, or other material. Composite structures made therefrom exhibit excellent sound-absorbent properties.

Moreover, the invention provides a process and an apparatus for welding foamed synthetic resin tubes to one another and/or to other foam materials. The synthetic resin surfaces to be welded together are guided by way of a spacer means at a distance past an electrically heated heat source to form a heating channel where the surfaces are melted and pressed together thereafter. The process and the apparatus are suited especially well for welding foams of non-crosslinked low-density polyethylenes.

38 Claims, 24 Drawing Sheets

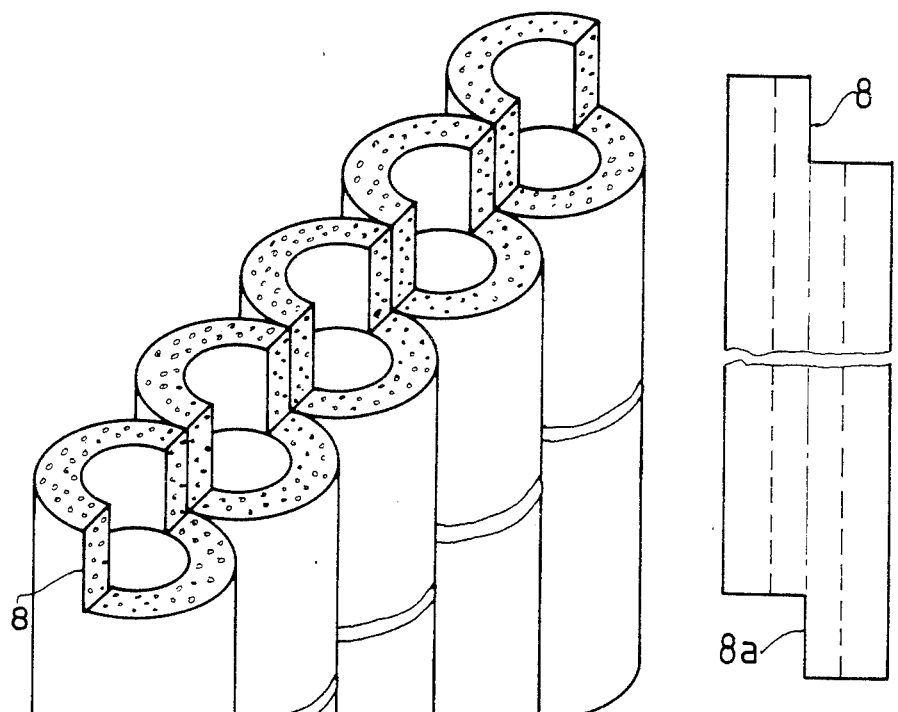
FIG. 5a
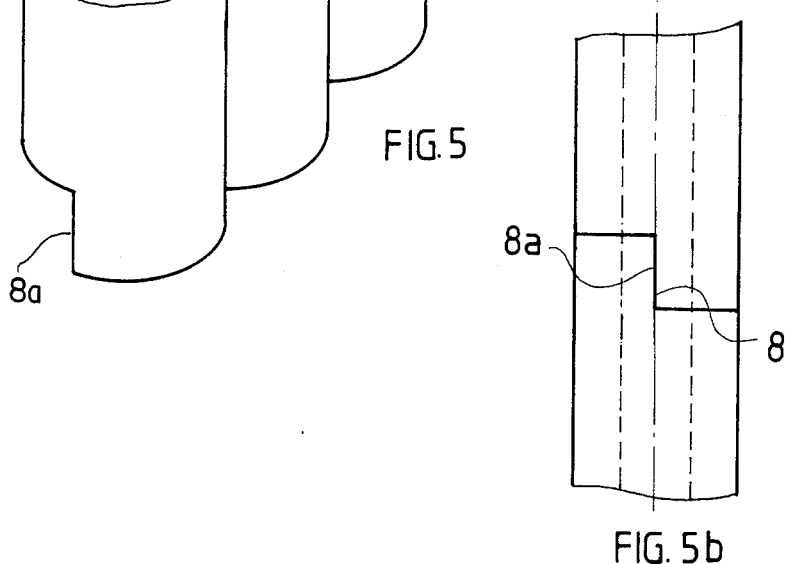
FIG. 5
FIG. 5b

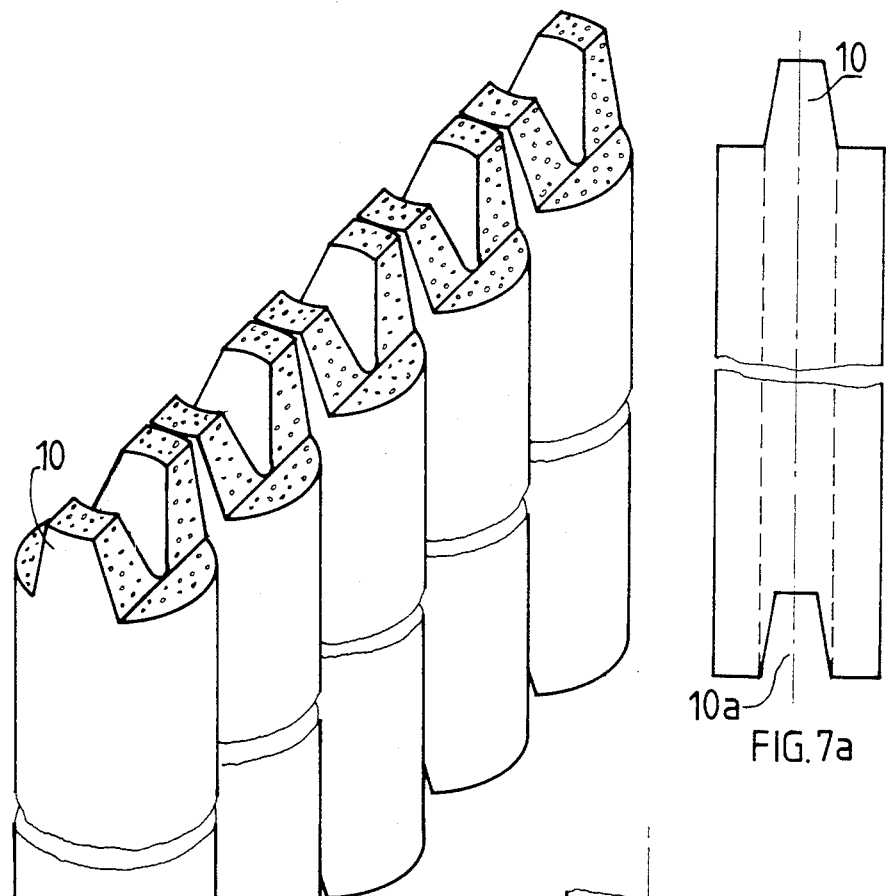
FIG. 7
FIG. 7a
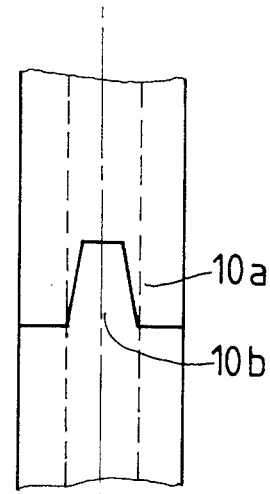
FIG. 7b

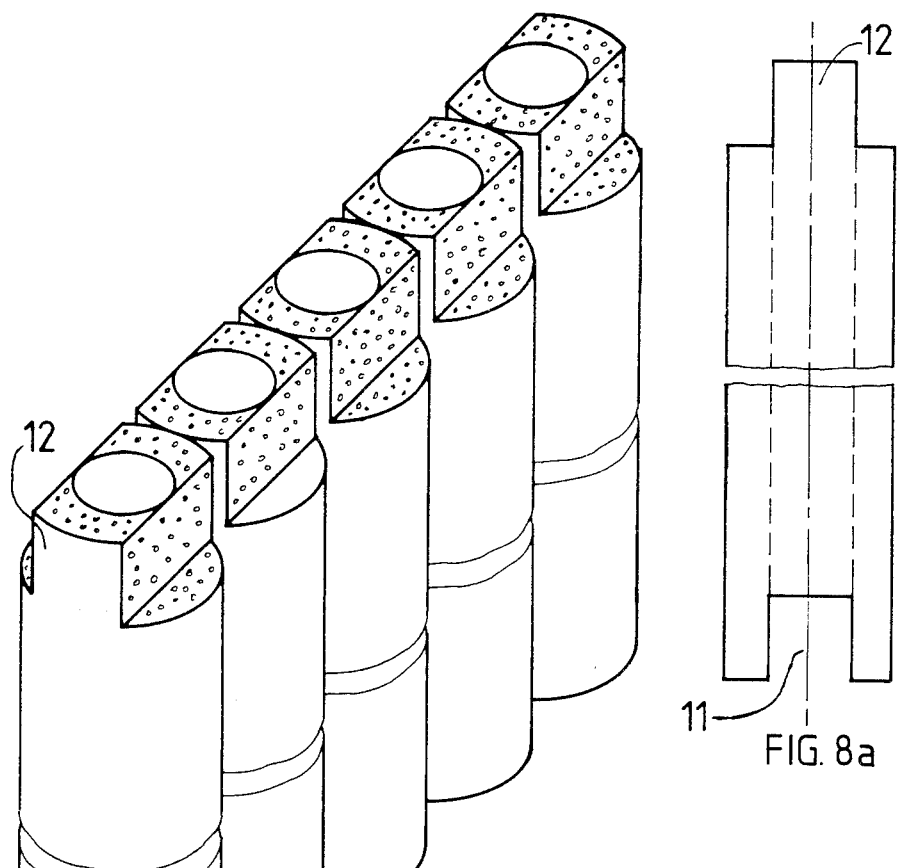
FIG. 8a
FIG. 8
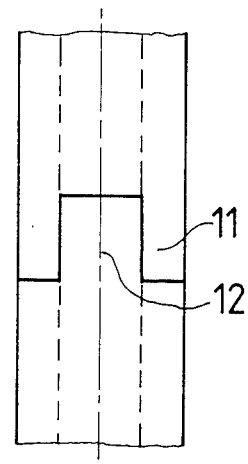
FIG. 8b

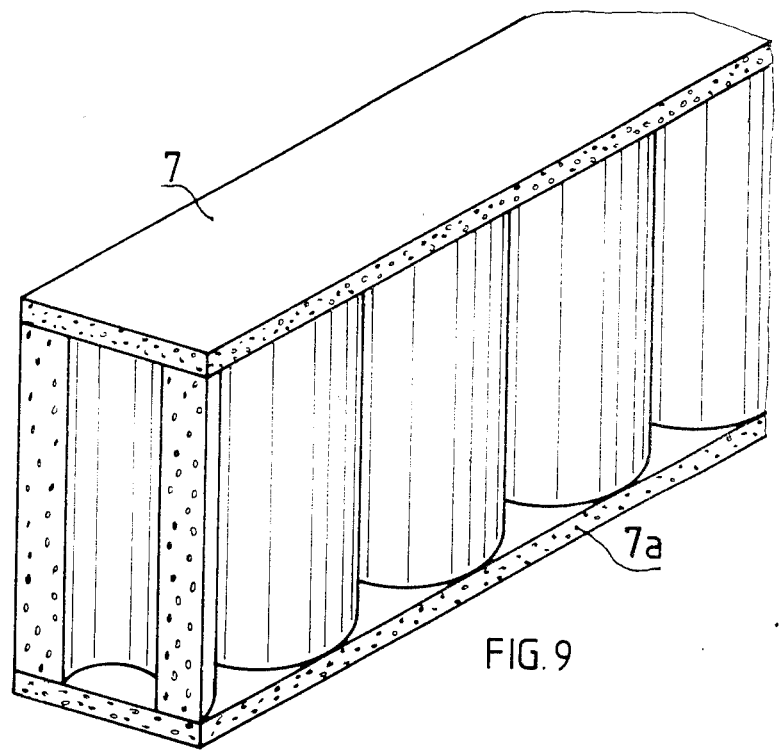
FIG. 9
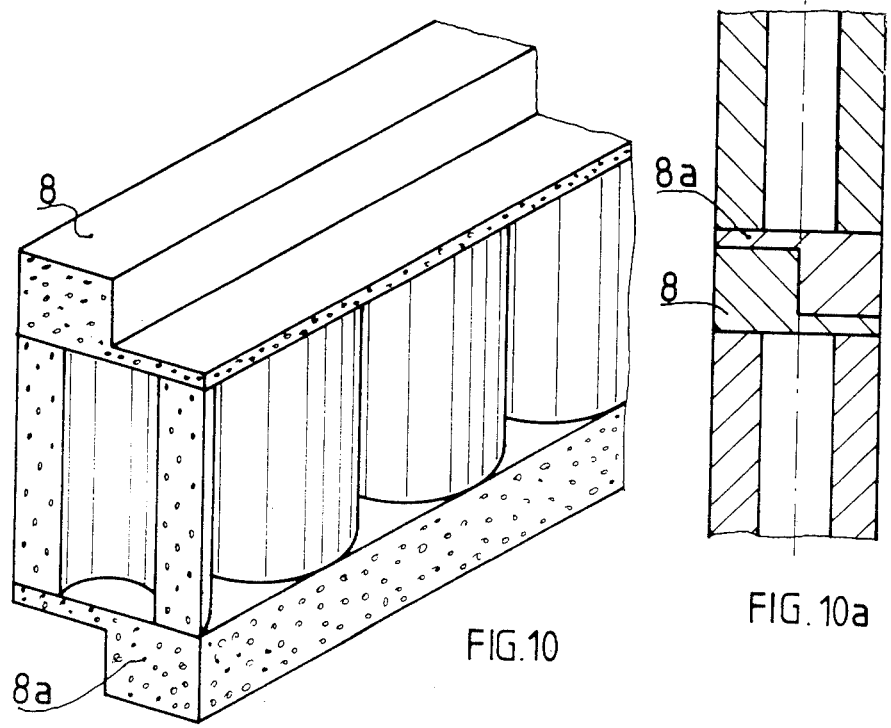
FIG. 10
FIG. 10a

FOAM PANELS AND BLOCKS OF HOLLOW PROFILES

The present invention relates to foam panels and/or blocks of synthetic resin material.

Foam panels or blocks made of synthetic resin material have been known. They range from rigid to highly elastic, they may consist of a wide variety of materials, their volume weights may vary widely, i.e. they can be relatively high, e.g. 800 kg/m$^3$, or relatively low, e.g. 30 kg/m$^3$. For purposes of thermal insulation especially foam materials are employed which are of very light weight and have a closed cell structure of very fine cells, if possible. Examples for such foams are polyurethane foams or polystyrene foams, but also foams produced from polyolefins, especially polyethylene.

The contiuous manufacture of very lightweight foam panels or blocks is relatively complicated and is possible only up to certain minimum volume weights.

Therefore, it is an object of the present invention to provide foam panels or blocks which can be manufactured relatively easily and which have very low volume weights, based on the total volume thereof. Moreover, it is a further object of the present invention to form the edges of the foam panels of the present invention so that, when assembled, they mutually secure each other in position, and the height of the air column determined by the inner voids of the hollow profiles can be limited to the panel dimensions by corresponding blockage.

According to the invention, this problem is solved in that hollow foam profiles are adhered and/or welded to one another and optionally their lateral edges are profiled. Preferably the hollow foam profiles employed are insulating foam tubes, especially tubes having a volume weight of less than 20 kg/m$^3$. Instead of normal insulating foam tubes having round cross section it is possible, according to the invention, to use any other imaginable hollow profiles, e.g. tubes with square, rectangular or oval cross section.

Preferred embodiments of the foam panels of the invention include panels described in the subclaims and explained in more detail hereafter with reference to FIGS. 1 to 46.

The foam panels and blocks according to the invention are produced in that the hollow foam profiles are glued together, bonded by solution welding or by thermal welding. A thermal welding method especially suited for the purposes of the invention is described in the second part of this description. Furthermore, it is possible to weld the extruded hollow foam profiles in situ, as is also described briefly in the second part of this description.

The invention will first be explained with reference to the figures, without being limited thereto. All the details apparent from the figures belong to the disclosure of the present invention to even if any given detail is not discussed hereafter. In the figures and in the following explanations the indicated reference numerals have the following meanings:

1: foam tubes
2, 2a, 2b, etc: tube panels each formed from a series of foam tubes disposed side by side
3, 3a: shorter panel edges of the foam panel
4, 4a: longer panel edges of the foam panel
5, 5a: panel edges on the sides formed by the open tube ends
6, 6a: panel edges on the sides formed by the tube walls
7, 7a: homogeneous or foamed film or sheet strips
8, 8a: stepped edge
9, 9a: round edge
9', 9'a: round edge profile bar with spacer function on both sides
9", 9"a: round edge profile bar with one-sided spacer function
10, 10a: wedge-shaped edge
11: groove
12: tongue
13: triple round edge profile bar
14: laminated facing layers
15: foamed facing layers
16: foamed interlayer
17: foam tubules or rods as spacers
18: larger tubes as spacers
19: tubes with rib as spacers
20: drainage holes
21: electrically heated heat conductor
22: wedge-shaped spacer means
23: rolls for the upper conveyor belt 24 of the twin belt system
24: upper conveyor belt of the twin belt system
25: rolls for the lower conveyor belt 26 of the twin belt system
26: lower conveyor belt of the twin belt system
27: foam panel composed of 4 tube panels
28: arrow indicating the direction of conveyance
29: frame of steel tubing
30: lateral confinement bars
31: foam tube
32: holes resulting from the foam tube interiors
33: holes resulting from the interstices between the welded foam tubes.

FIG. 5 is a perspective view of a foam panel according to FIG. 1 where the panel edges formed by the tube ends have a stepped profile 8, 8a cut out of the tube ends.

FIG. 5a is a plan view of the panel edge 6 formed by the tube wall of the first tube in the foam panel.

FIG. 5b is a plan view of the stepped edge 8, 8a as formed when two matching foam panels according to FIG. 5 are put together.

FIG. 7 is a perspective view of a foam panel according to FIG. 1 where the panel edges formed by the tube ends have the shape of a wedge 10, 10a cut out of the tube ends.

FIG. 7a is a plan view of the panel edge 6 formed by the tube wall of the first tube in the foam panel.

FIG. 7b is a plan view of the wedge 10, 10a formed when two matching foam panels according to FIG. 7 are put together.

FIG. 8 is a perspective view of a foam panel according to FIG. 1 in which the panel edges formed by the tube ends have a groove 11 and a tongue 12, respectively, cut out of the tube ends.

FIG. 8a is a plan view of the panel edge 6 formed by the tube wall of the first tube in the foam panel.

FIG. 8b is a plan view of the groove-and-tongue joint 11, 12 formed when two matching foam panels according to FIG. 8 are put together.

FIG. 9 is a schematic perspective view of a foam panel according to FIG. 1 whose open tube ends are provided on both sides with a foam strip 7, 7a. In the foreground of the figure the foam panel is cut through along the longitudinal axis of a tube in order to demonstrate the position of the weld.

Figure 1:
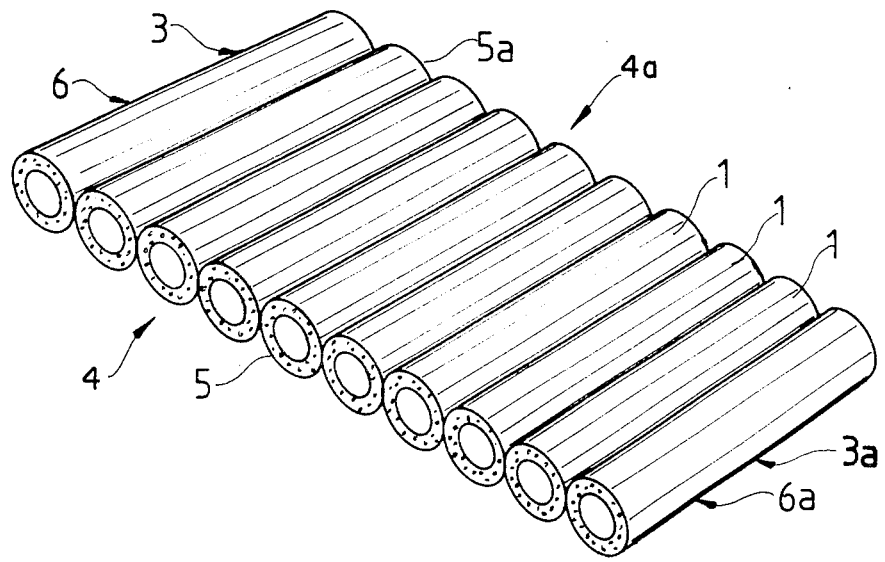
FIG. 1 is a perspective view of a foam panel of rectangular shape in plan view consisting of one layer of short foam tubes arranged side by side in parallel and welded together.

FIG. 10 is a schematic perspective view of a foam panel according to FIG. 1 whose open tube ends are provided on both sides with a stepped edge profile bar of synthetic resin foam, preferably the same foam from which the tubes are made. When two matching foam panels are put together they form a step joint. In the foreground the foam panel is cut through along the longitudinal axis of a tube in order to demonstrate the position of the profile bars.

FIG. 10a is a cross section through a stepped profile joint.

Figure 11:
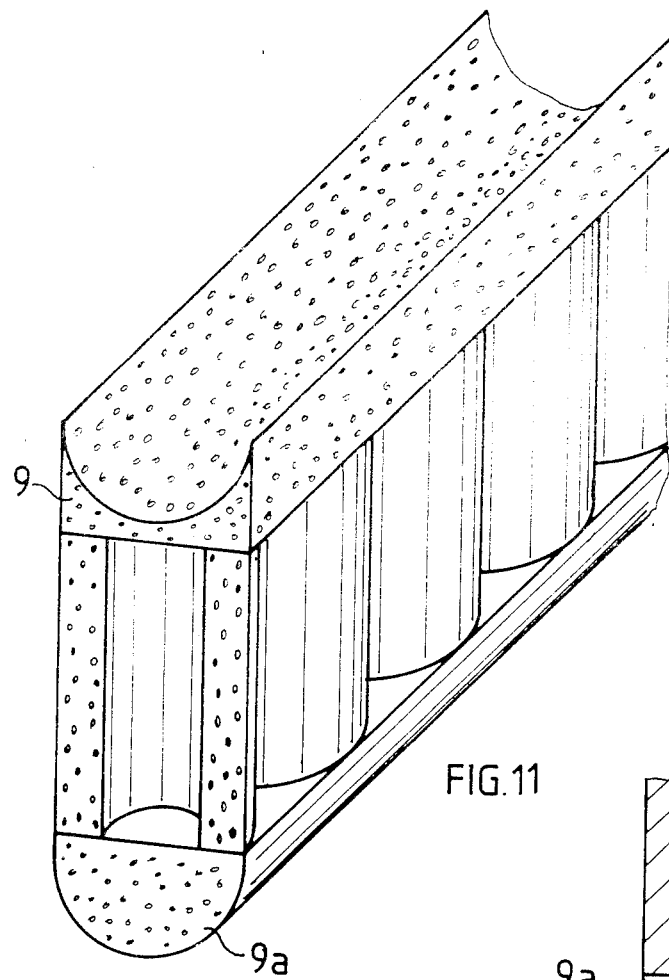

FIG. 11 is a schematic perspective view of a foam panel according to FIG. 1 whose open tube ends are provided on both sides with a round edge profile bar of synthetic resin foam welded thereto, preferably the same synthetic resin foam as the tube material. When two matching foam panels are put together they form a round edge joint. In the foreground the foam panel is cut through along the longitudinal axis of a tube in order to demonstrate the position of the profile bars.

Figure 11A:
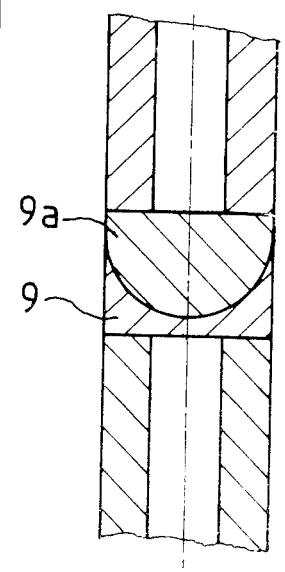

FIG. 11a is a cross section through a round edge joint.

Figure 12:
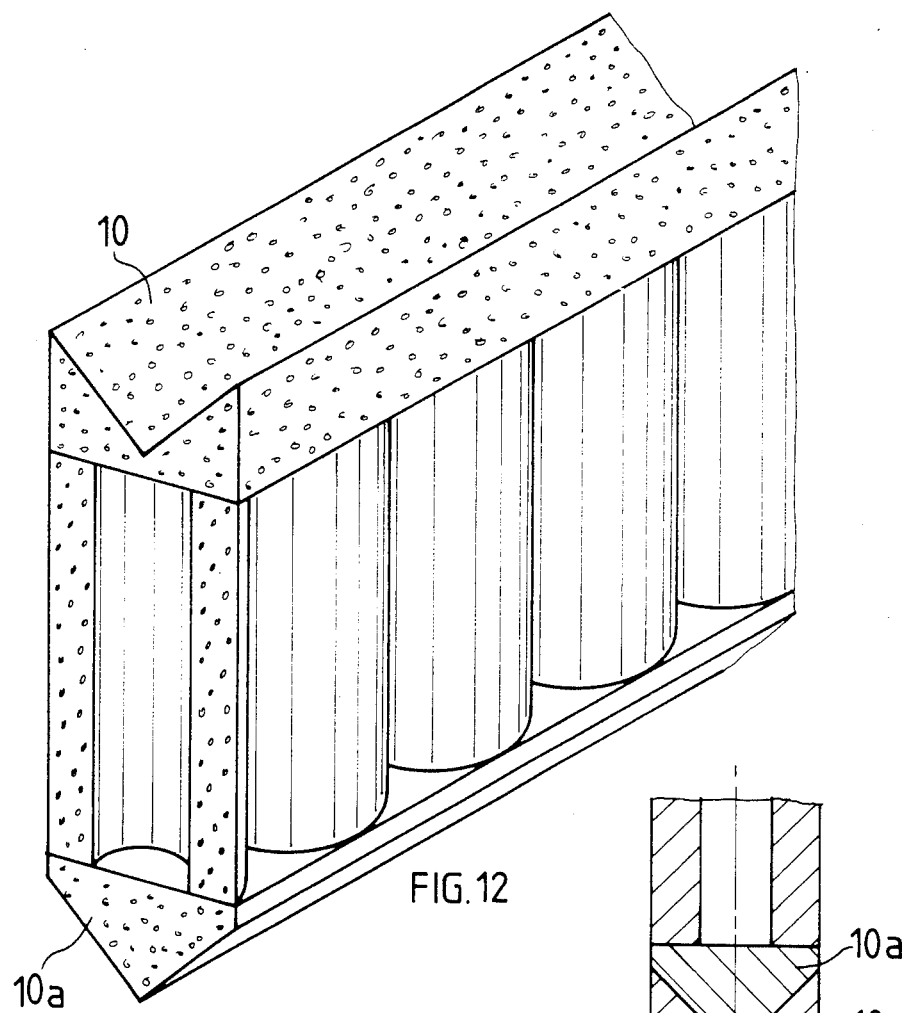

FIG. 12 is a schematic perspective view of a foam panel according to FIG. 1 whose open tube ends are provided on both sides with a wedge edge profile bar of synthetic resin foam welded thereto, preferably the same synthetic resin foam as the tube material. Two matching foam panels put together form a wedge joint. In the foreground the foam panel is cut along the longitudinal axis of a tube in order to demonstrate the position of the profile bars.

Figure 12A:
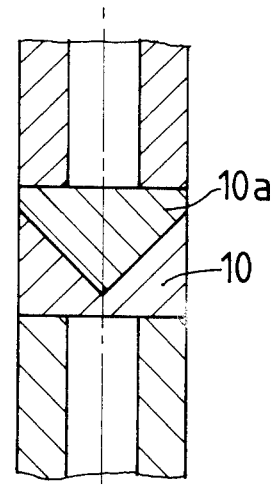

FIG. 12a is a cross section through a wedge joint. In this manner a grooved profile bar can be welded or adhered to one edge and a tongue profile bar, or tongue profile bars of different configuration, can be welded or adhered to the other edge.

Figure 13:
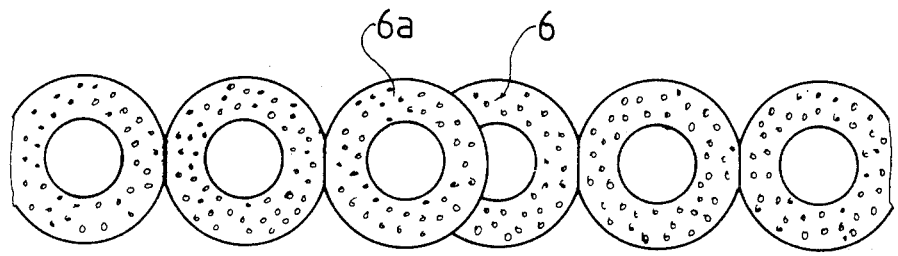

FIG. 13 is a section through a panel joint of the round edge type which extends along the panel edges formed by the tube walls 6, 6a, in which the panel edge formed by the tube wall 6a of one tube panel is unchanged, while the panel edge formed by the tube wall 6 of the other tube panel is cut out in a circular arc along the length axis of the tube.

Figure 14:
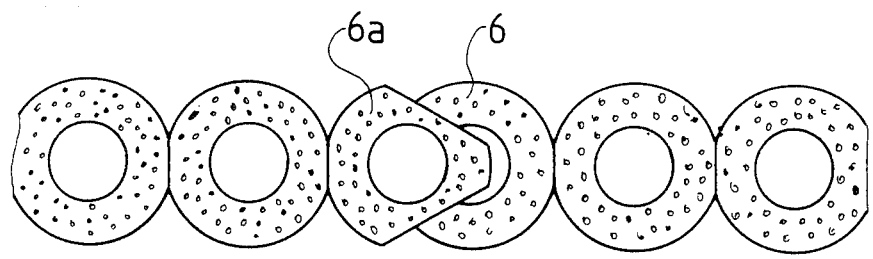

FIG. 14 is a cross section through a panel joint of the wedge edge type which extends along the panel edges formed by the tube walls 6, 6a. One panel edge formed by the tube wall 6 of the one tube panel is cut out in segment form along its longitudinal axis, and the other panel edge formed by the tube wall 6a of the other tube panel is cut out in wedge form so that it extends and fits into the segment-shaped cut in the tube of the other tube panel. The interior cavity of the tube 6a cut to wedge shape is preferably filled with a foam rod, especially a rod of a material more rigid than the tube material.

Figure 15:
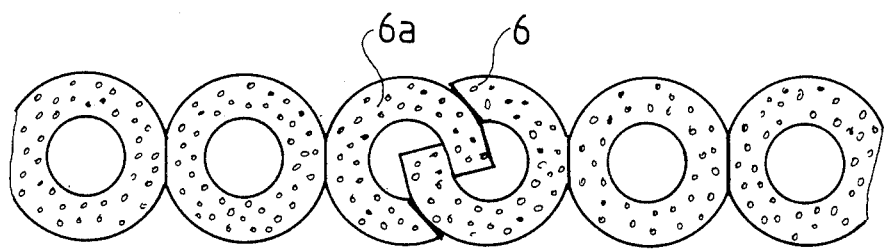

FIG. 15 is a cross section through a panel joint in which both panel edges formed by tube walls 6, 6a are cut out in segment form along the longitudinal axes so that two matching panels can be hooked together, i.e. the segment-formed gaps are disposed laterally opposite each other, and the size of the segment gaps is equal to or somewhat smaller than the thickness of the tube wall.

Figure 3:
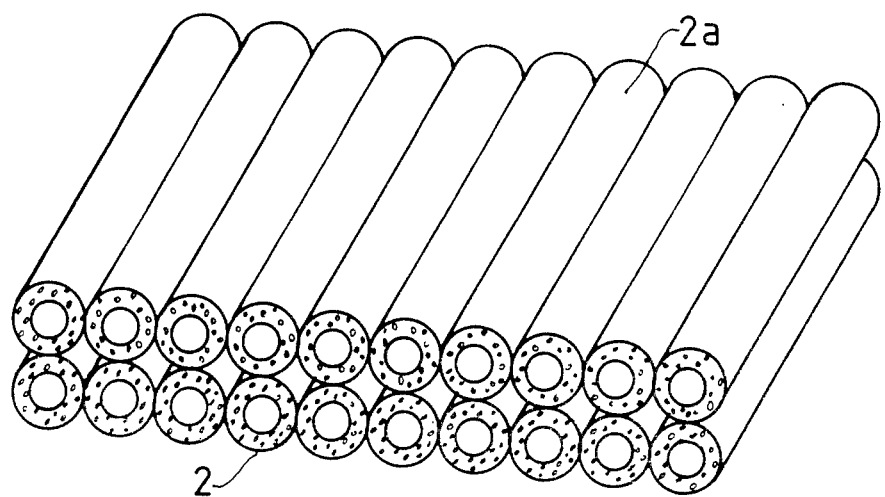
FIG. 3 is a perspective view of a foam panel consisting of two superposed layers of short foam tubes arranged side by side in parallel and welded together.
Figure 4:
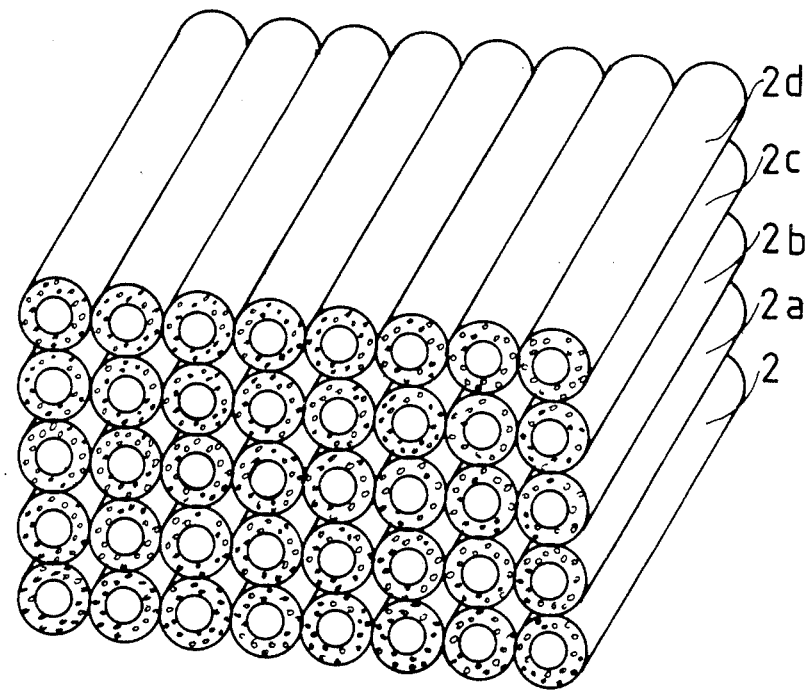
FIG. 4 is a perspective view of a foam block consisting of five superposed layers of short foam tubes arranged side by side in parallel and welded together.
Figure 6:
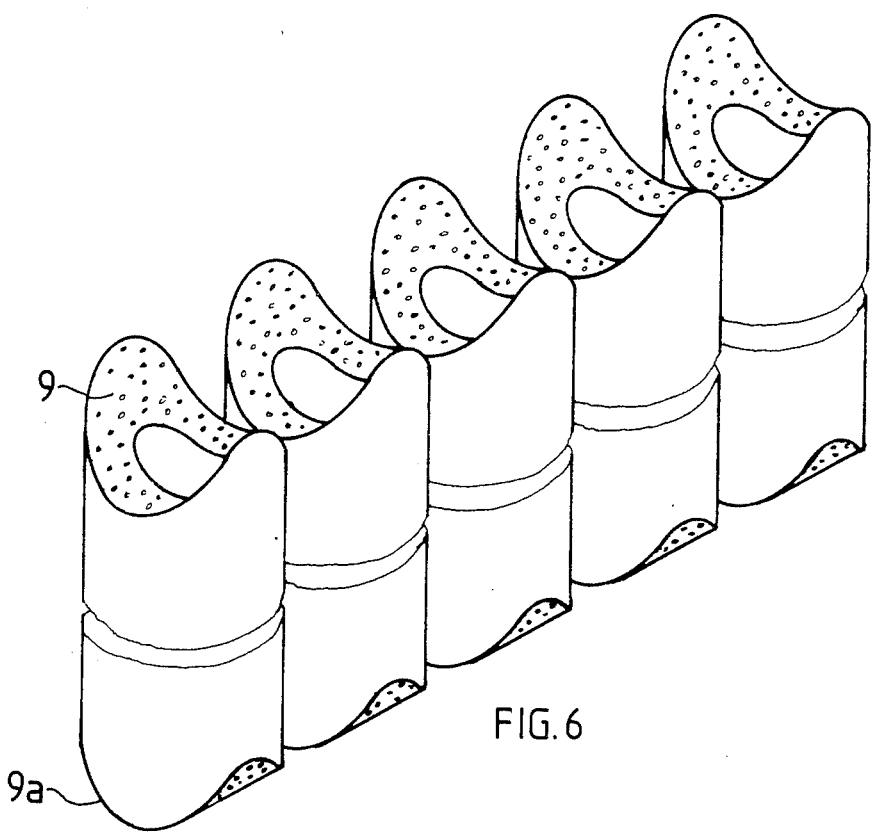
FIG. 6 is a perspective view of a foam panel according to FIG. 1 where the panel edges formed by the tube ends have a round configuration 9, 9a cut out of the tube ends.
Figure 6A:
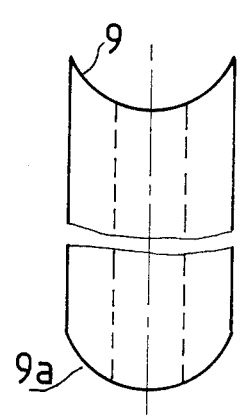
FIG. 6a is a plan view of the panel edge 6 formed by the tube wall of the first tube in the foam panel.
Figure 6B:
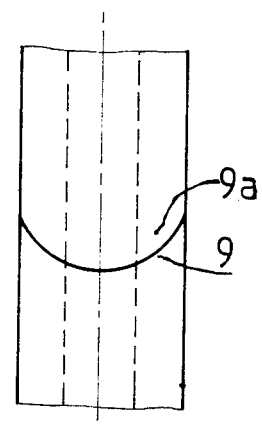
FIG. 6b is a plan view of the round edge 9, 9a as formed when two matching foam panels according to FIG. 6 are put together.
Figures 16, 16A:
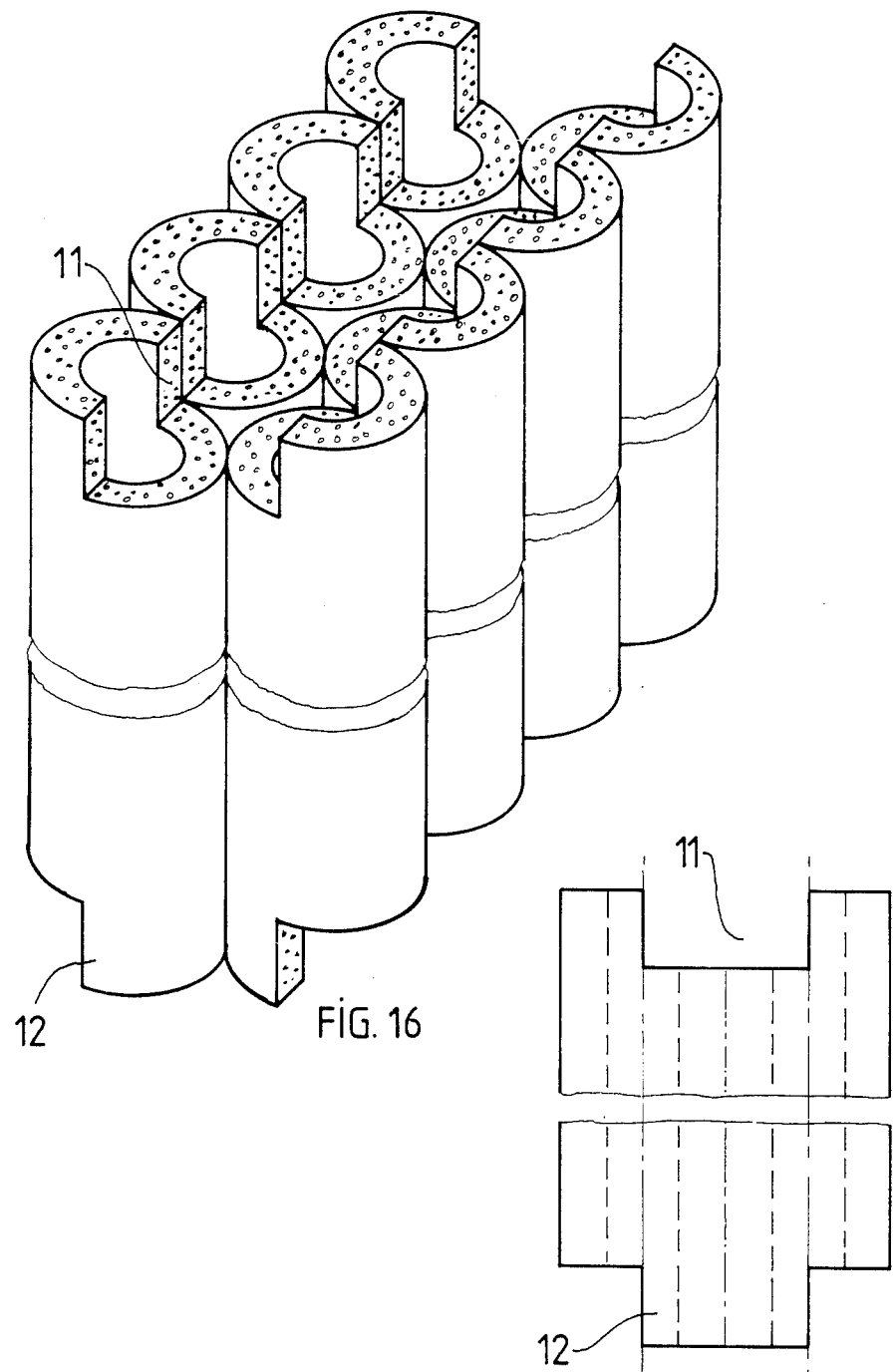

FIG. 16 is a perspective view of a foam panel composed of two tube panels according to FIG. 3 in which the panel edges formed by the tube ends show a groove 11 and tongue 12, respectively, cut out of the tube ends.

FIG. 16a is a plan view of the tube edge formed by the two tube walls of the first two tubes in the foam panel.

Figure 17:
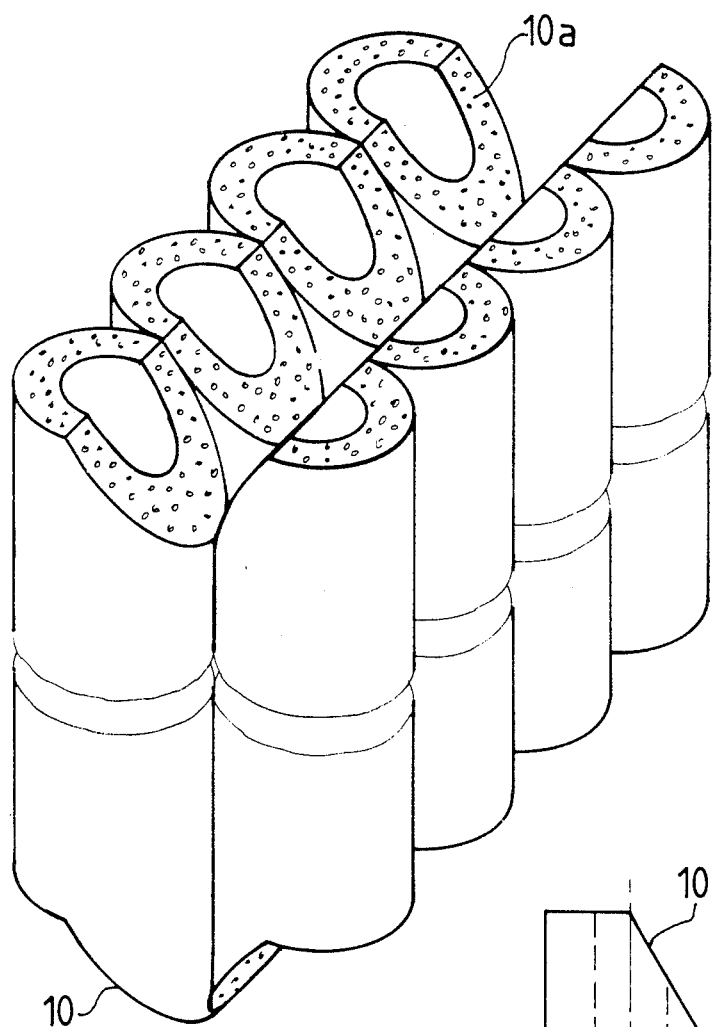

FIG. 17 is a perspective view of a foam panel composed of two tube panels according to FIG. 3 in which the panel edges formed by the tube ends have a wedge-shaped edge 10, 10a cut out of the tube ends.

Figure 17A:
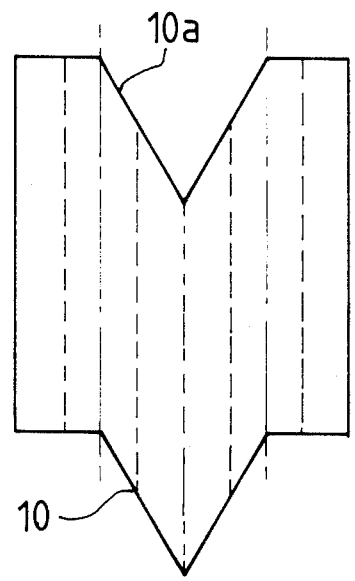

FIG. 17a is a plan view of the tube edge formed by the two tube walls of the first two tubes in the foam panel.

Figure 18:
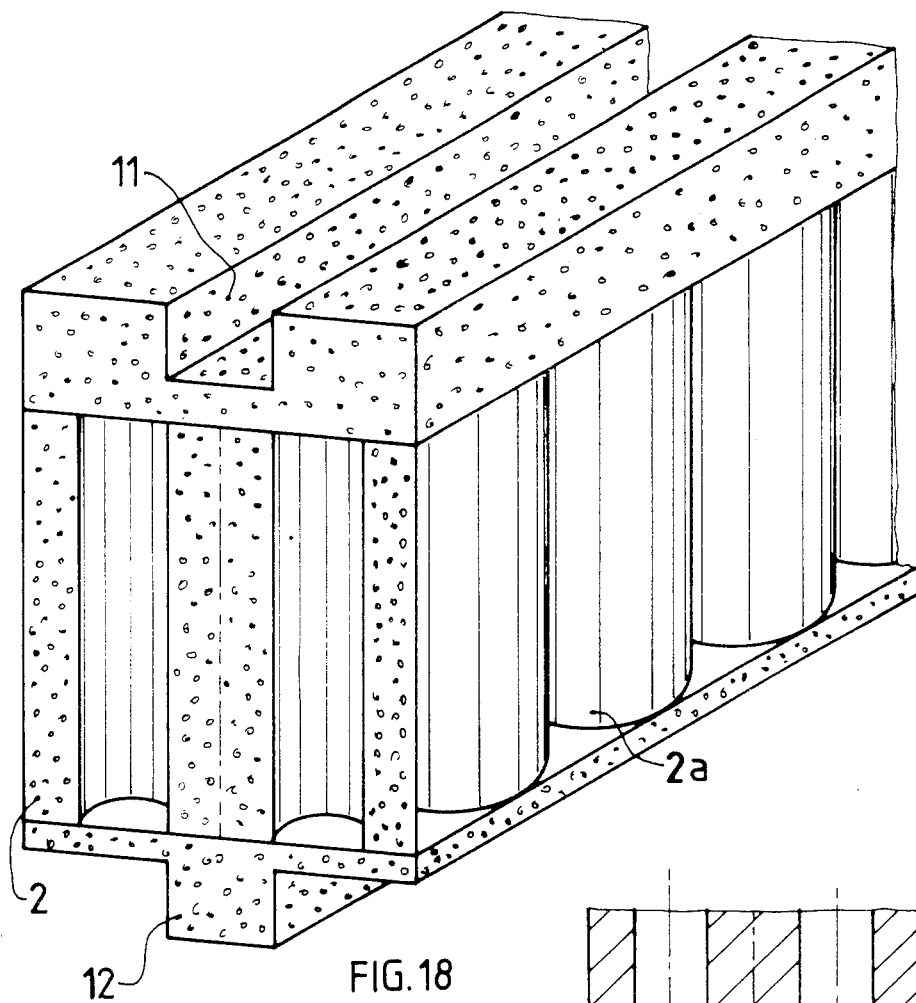

FIG. 18 is a perspective view of a foam panel composed of two tube panels according to FIG. 3 in which the panel edges formed by the tube ends have a groove (11) and tongue (12) profile bar of synthetic resin foam welded thereto, preferably of the same foam material as the tube material. In the foreground the foam panel is cut along the longitudinal axis of the illustrated tube in order to demonstrate the position of the profile bars.

Figure 18A:
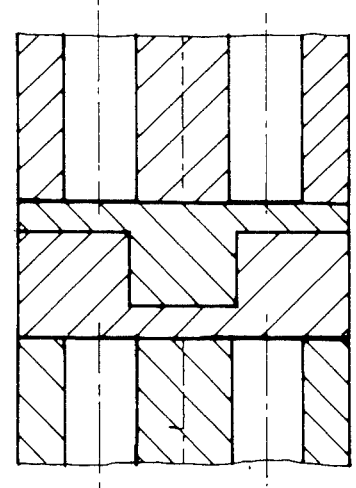

FIG. 18a is a section through a groove-and-tongue joint formed by two matching foam panels of FIG. 18.

Figure 19:
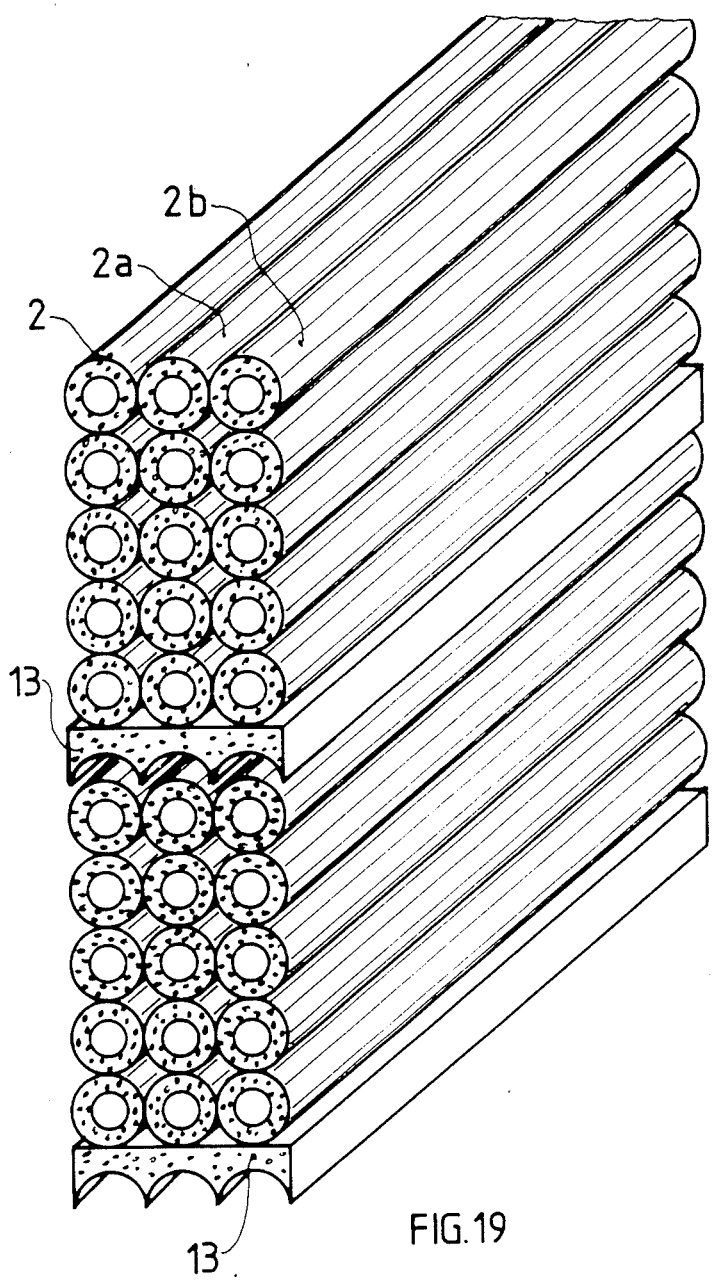

FIG. 19 is a perspective view of two foam panels joined one to the other and composed each of three tube panels 2, 2a and 2b welded together, one panel edge being provided with a triple round edge profile bar 13, which together with the three end tubes of the matching other panel edge forms a triple round edge joint. The crosswise edges formed by the tube ends, if desired, can have the above described edge configurations or can form similar types of joints, either by direct cutting or by provision of matching profile bars.

Figure 20:
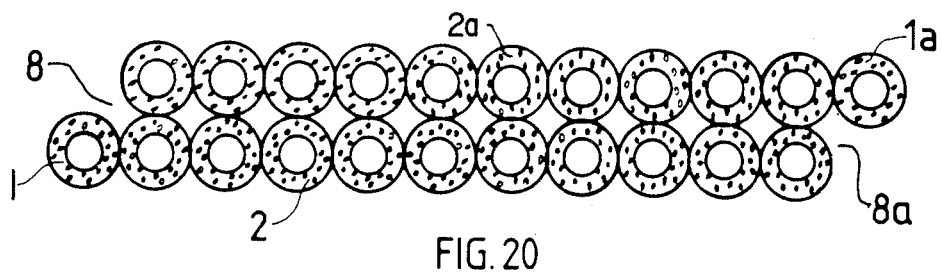

FIG. 20 is a cross section through a foam panel consisting of two superposed tube panels 2, 2a in which the conditions for a stepped edge 8, 8a are provided by welding an additional tube 1 to the left-hand side below and a tube 1a to the right-hand side above.

Figure 21:
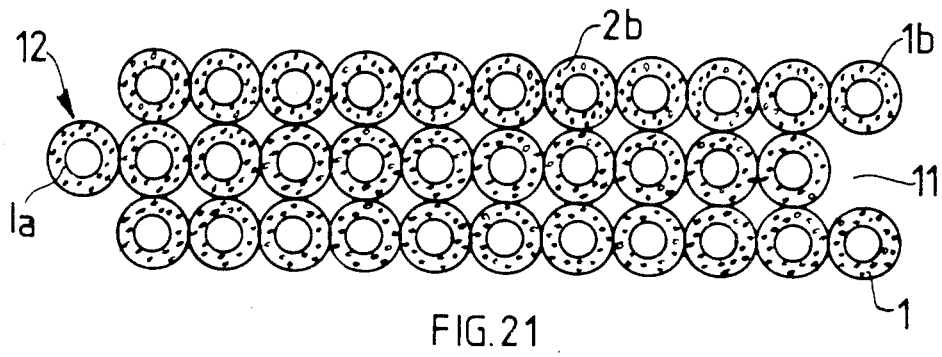

FIG. 21 is a cross section through a foam panel composed of three superposed tube panels 2, 2a and 2b in which a groove 11 and a tongue 12 are formed by welding additional tubes 1, 1a, 1b thereto.

Figure 22:
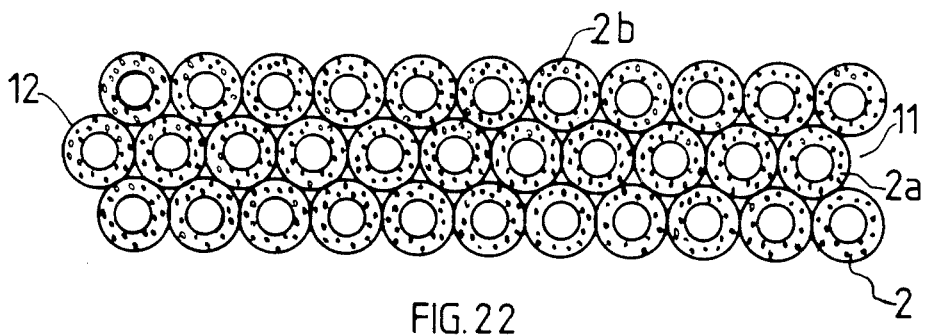

FIG. 22 shows a foam panel like that illustrated by FIG. 21 in which the central tube panel is so arranged that the longitudinal axes of the associated tubes are each disposed in the vertical plane extending through the weld seams above and below. In this case, too, a groove 11 is formed on one and a tongue 12 is formed on the other side.

Figure 2:
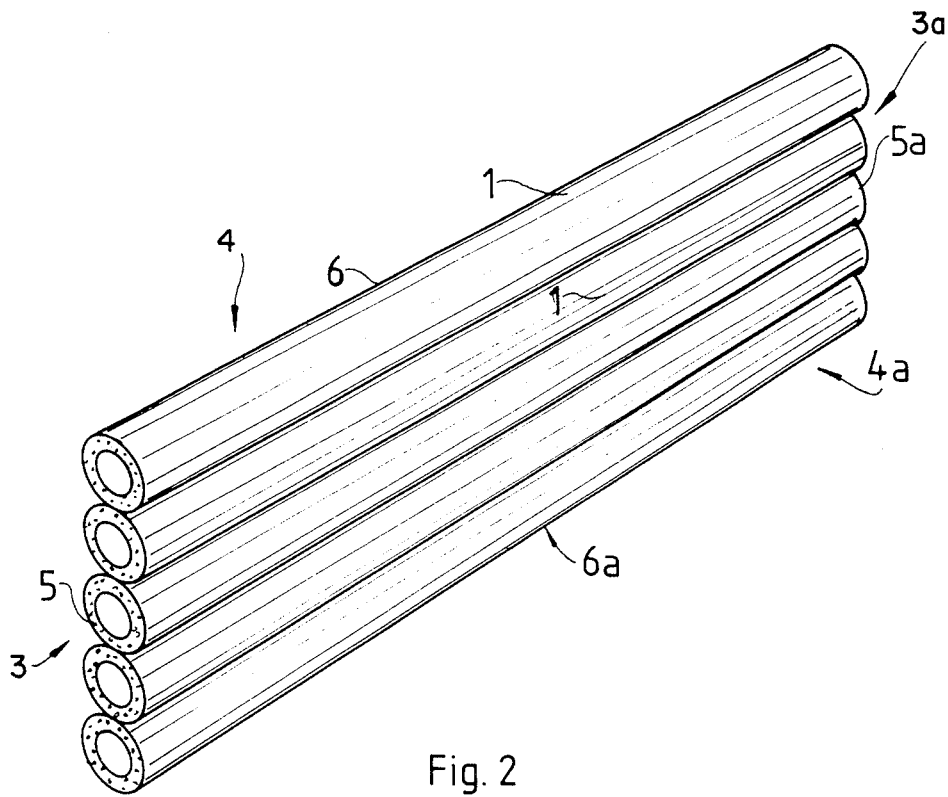
FIG. 2 is a perspective view of a foam panel of rectangular shape in plan view consisting of one layer of long foam tubes arranged side by side in parallel and welded together.
Figure 23:
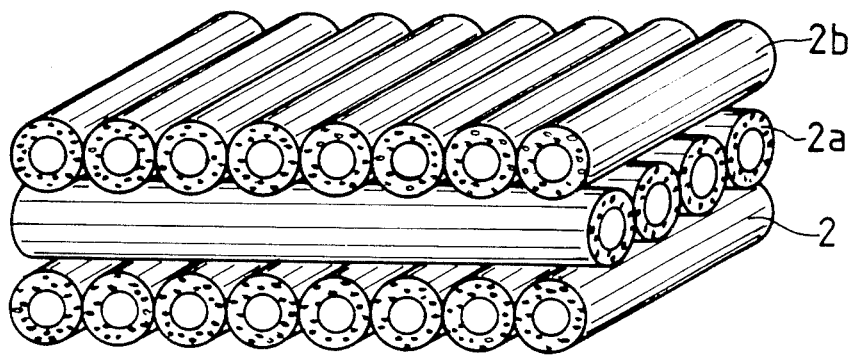

FIG. 23 is a perspective view of three superposed tube panels, the top and bottom tube panel corresponding to that of FIG. 1, while the intermediate tube panel corresponds to the tube panel of FIG. 2.

Figure 24:
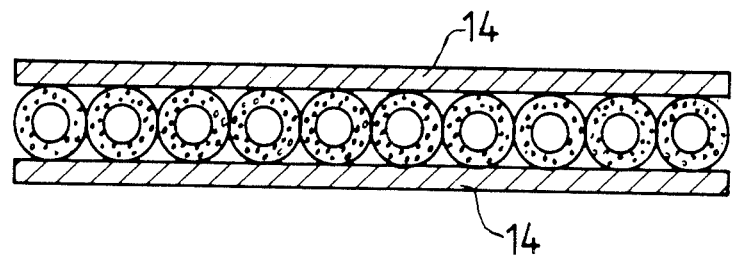

FIG. 24 is a cross section through a foam panel with a foam layer 14 laminated to both sides thereof.

Figure 25:
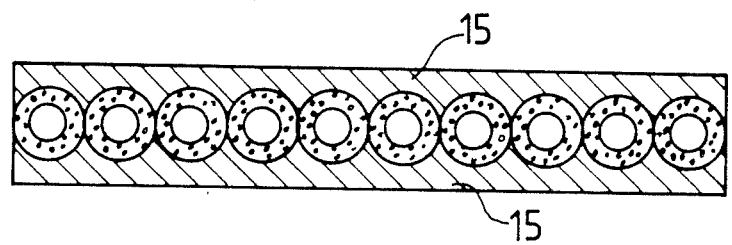

FIG. 25 is a cross section through a foam panel onto which a synthetic resin layer 15 has been foamed on both sides.

Figure 26:
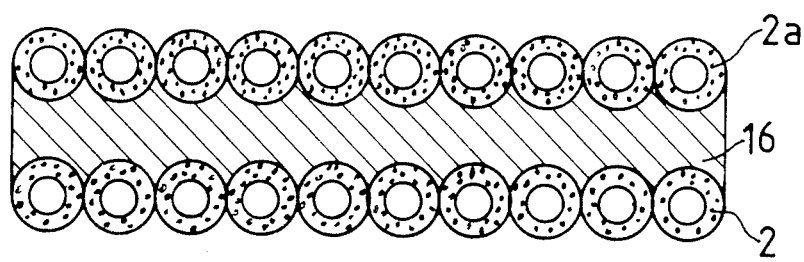

FIG. 26 is a cross section through a foam panel in which two tube panels 2 and 2a are joined together by way of a foam layer 16.

Figure 27:
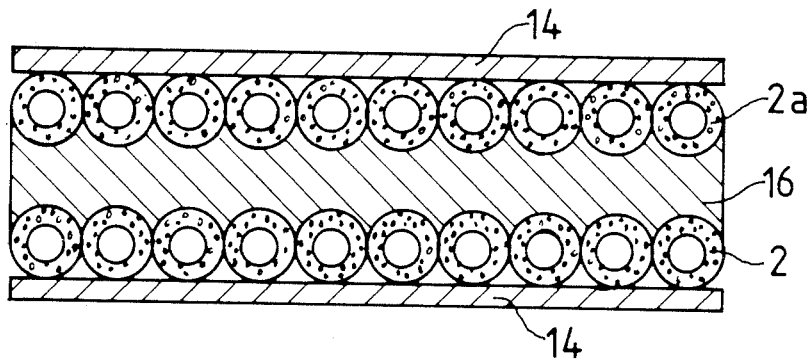

FIG. 27 is a cross section through a foam panel according to FIG. 26 with a foam layer 14 additionally laminated to both sides thereof.

Figure 28:
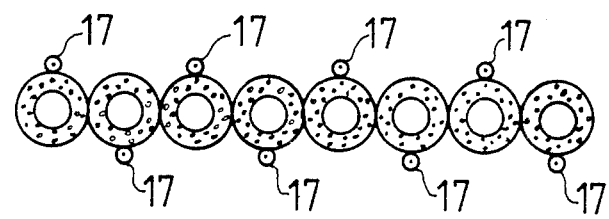

FIG. 28 is a cross section through a foam panel provided on both sides at spaced intervals with spacers in the form of round foam sticks 17 which may optionally have a wire core.

Figure 29:
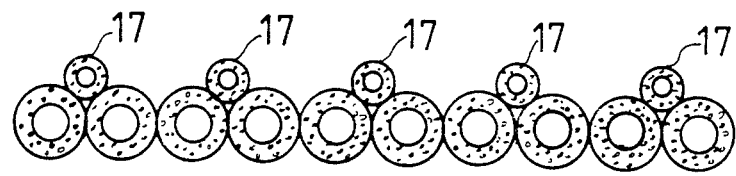

FIG. 29 is a cross section through a foam panel to which smaller foam tubes 17 are welded to serve as spacers.

Figure 30:
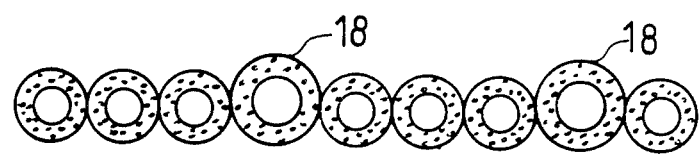

FIG. 30 is a cross section through a foam panel in which at spaced intervals the standard tubes are replaced by larger tubes 18 which project from one side and in this way perform the spacing function.

Figure 31:
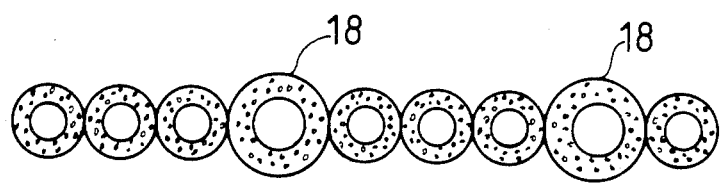

FIG. 31 is a cross section through a foam panel of a structure similar to that of the foam panel in FIG. 30 except that the larger tubes 18 are so arranged that they project uniformly from both sides and in this way can perform the spacing function in two directions. Of course, also a modification is imaginable where said larger foam tubes 18 project more from one side than from the other side.

Figure 32:
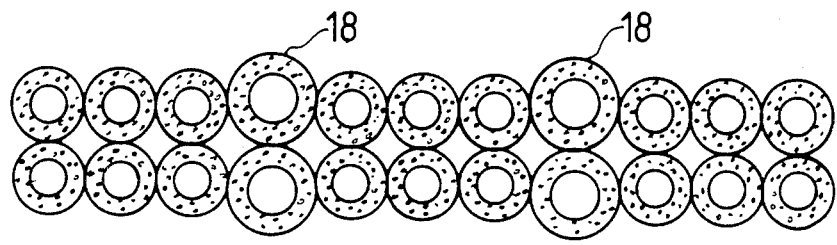

FIG. 32 is a cross section through a foam panel composed of two tube panels according to FIG. 30 in which the larger tubes 18 again perform the spacing function.

Figure 33:
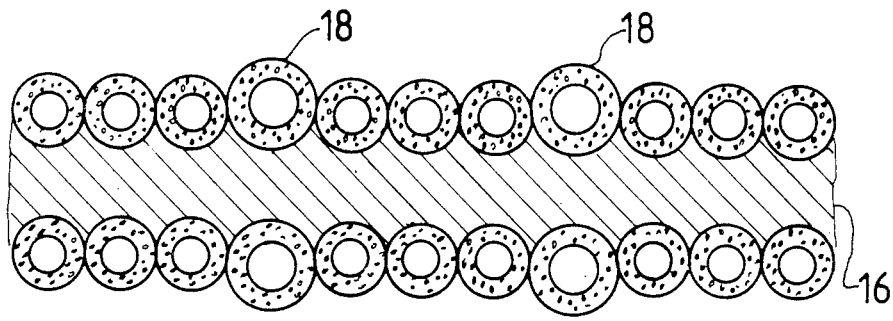

FIG. 33 is a cross section through a composite foam panel in which two tube panels according to FIG. 30 are joined by a foam interlayer 16. Here, too, the larger tubes 18 serve as spacers.

Figure 34:
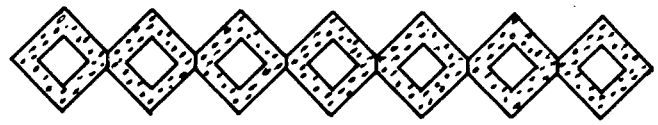

FIG. 34 is a cross section through a foam panel of quadrangular hollow profiles joined cornerwise. The free corners of said panel serve as spacers.

Figure 35:
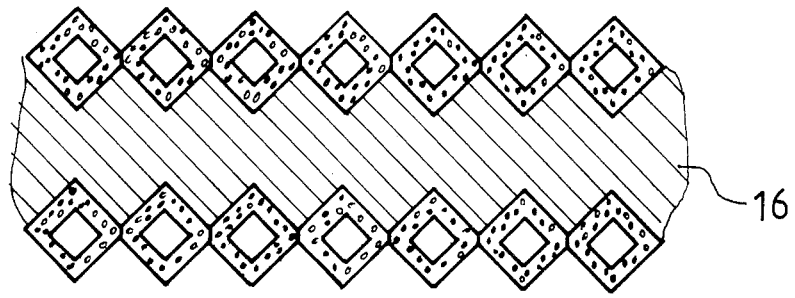

FIG. 35 is again a cross section through a composite panel, this time composed of two panels according to FIG. 34 which are joined together by way of a foam layer 16. The free corners of the panels composed of the quadrangular hollow profiles again function as spacers.

Figure 36:
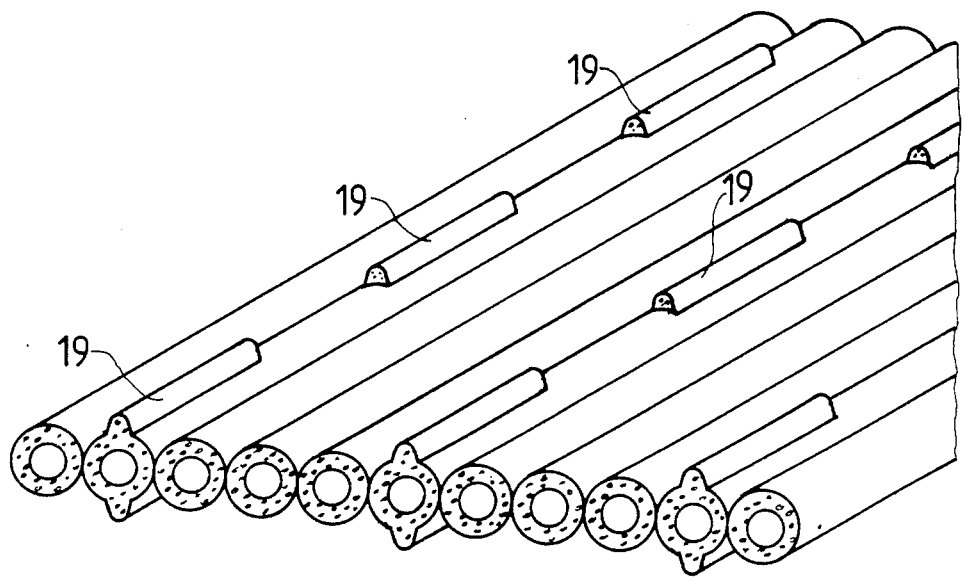

FIG. 36 is a schematic perspective view of a foam panel in which foam tubes having generally the same diameter as the other foam tubes are arranged and additionally carry a rib 19 on top and on the bottom; said rib may be cut away or pressed down in places, and the length of the ribs may vary. The ribs again serve as spacers. Of course, among said ribbed tubes also embodiments are possible which carry the rib on only one side.

Figure 37:
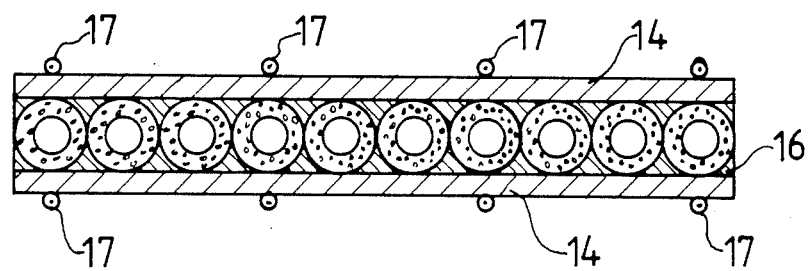

FIG. 37 is a cross section through a foam panel with a facing layer 14 on both sides joined to the tube panel by means of foam 15. Moreover, on the homogeneous facing layers there are provided at spaced intervals round foam rods 17, optionally with a wire core, as spacers.

Figure 38:
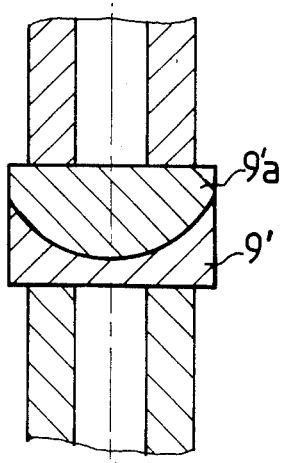

FIG. 38 shows a section through two panel edges having round edge profile bars 9', 9'a welded thereto. Said round edge profile bars are larger than the tube diameters so that they uniformly project on both sides and in this way act as spacers on both sides.

Figure 39:
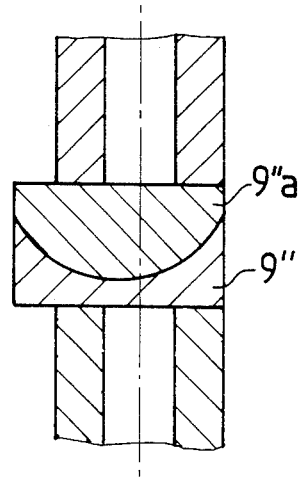

FIG. 39 likewise is a section through a round edge joint between two panels in which, however, the round edge profile bars 9'', 9''a are welded to the tube so that they project on only one side as spacers.

Figure 40:
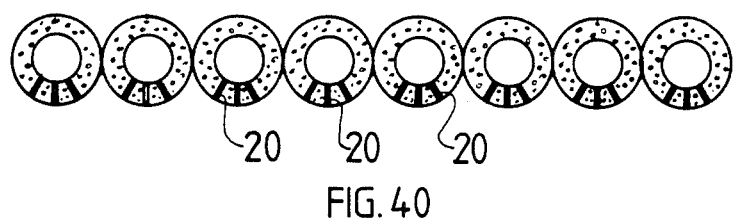

FIG. 40 is a cross section through a foam panel provided on one side with drain holes 20.

Figure 41:
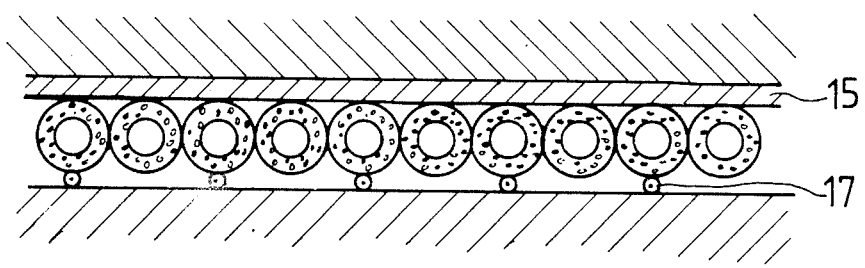

FIG. 41 demonstrates the use of a foam panel provided on one side with a foam layer 15 and on the other side with spacers 17 and disposed in the space formed in an external building wall between the external wall proper and the facing provided in front thereof. The foam layer 15 comes to lie against the wall constituting the supporting wall, while the spacers lie against the curtain wall which may consist, for example, of klinker bricks.

Figure 42:
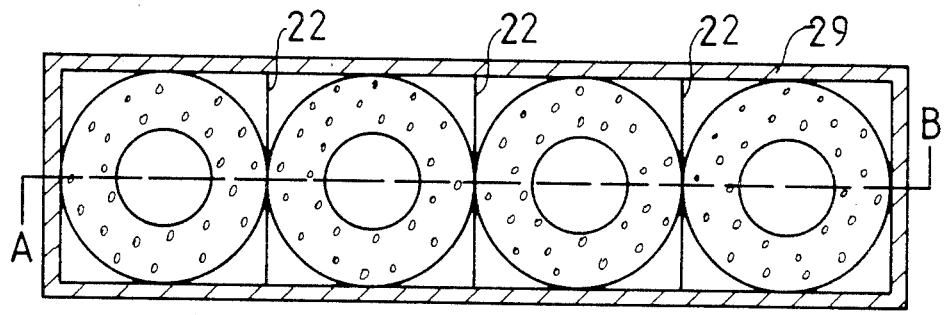
Figure 43:
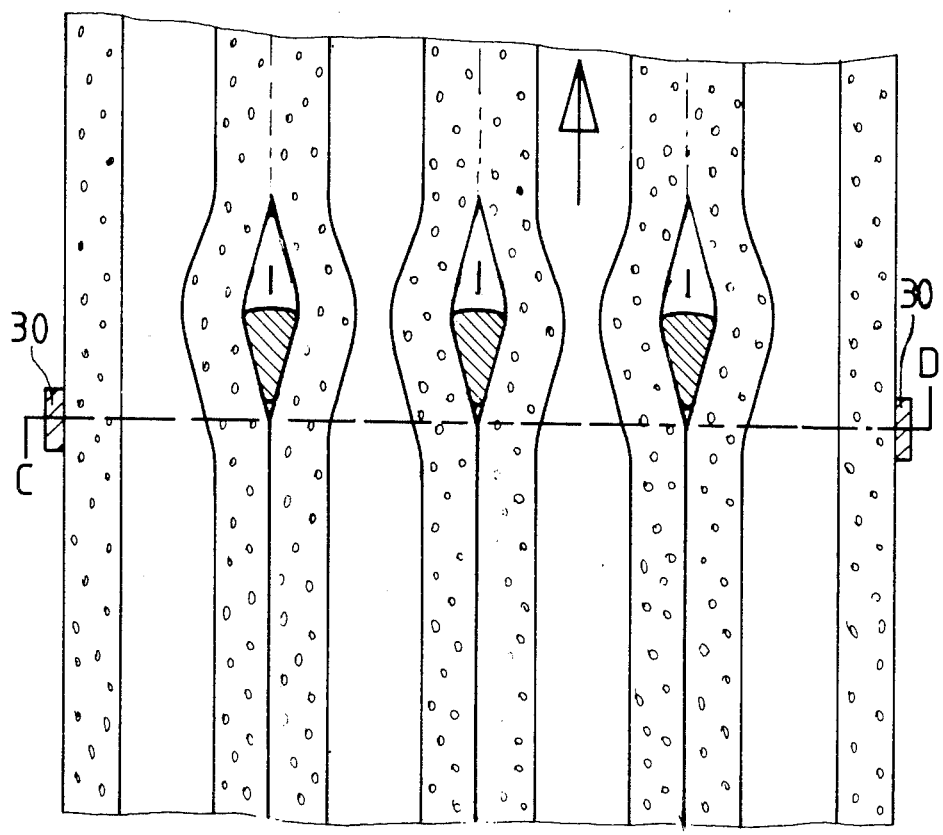

FIG. 42 is a vertical section through a lattice arrangement according to the invention with three welding apparatuses along the line C-D in FIG. 43 for welding foam tubes together which are disposed side by side and which, in practice, is so designed that—depending on the tube diameter—ten to twenty tubes can be welded together simultaneously in one plane.

FIG. 43 is a horizontal longitudinal section along the line A-B in FIG. 42.

Figure 44:
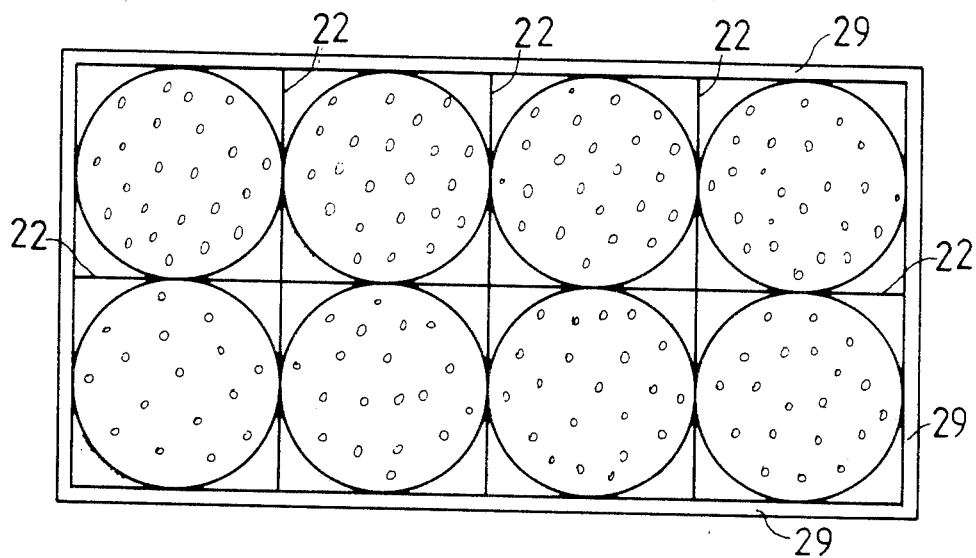

FIG. 44 is a vertical section through a lattice arrangement according to the invention with one horizontally and three vertically disposed welding means for simultaneously welding foam tubes arranged side by side and one above the other.

Figure 45:
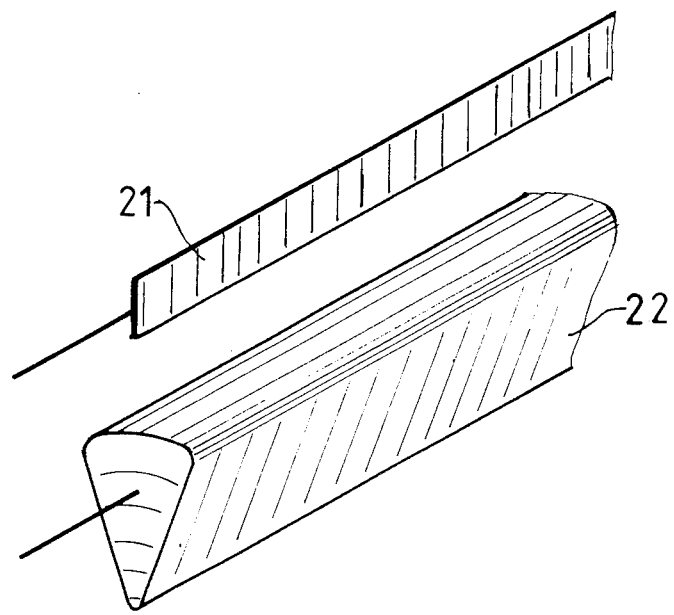

FIG. 45 is a schematic perspective view of the wedge-shaped embodiment of the spacer means preferred according to the invention and thereabove an electrically heated heat conductor in the form of a metal strip.

Figure 46:
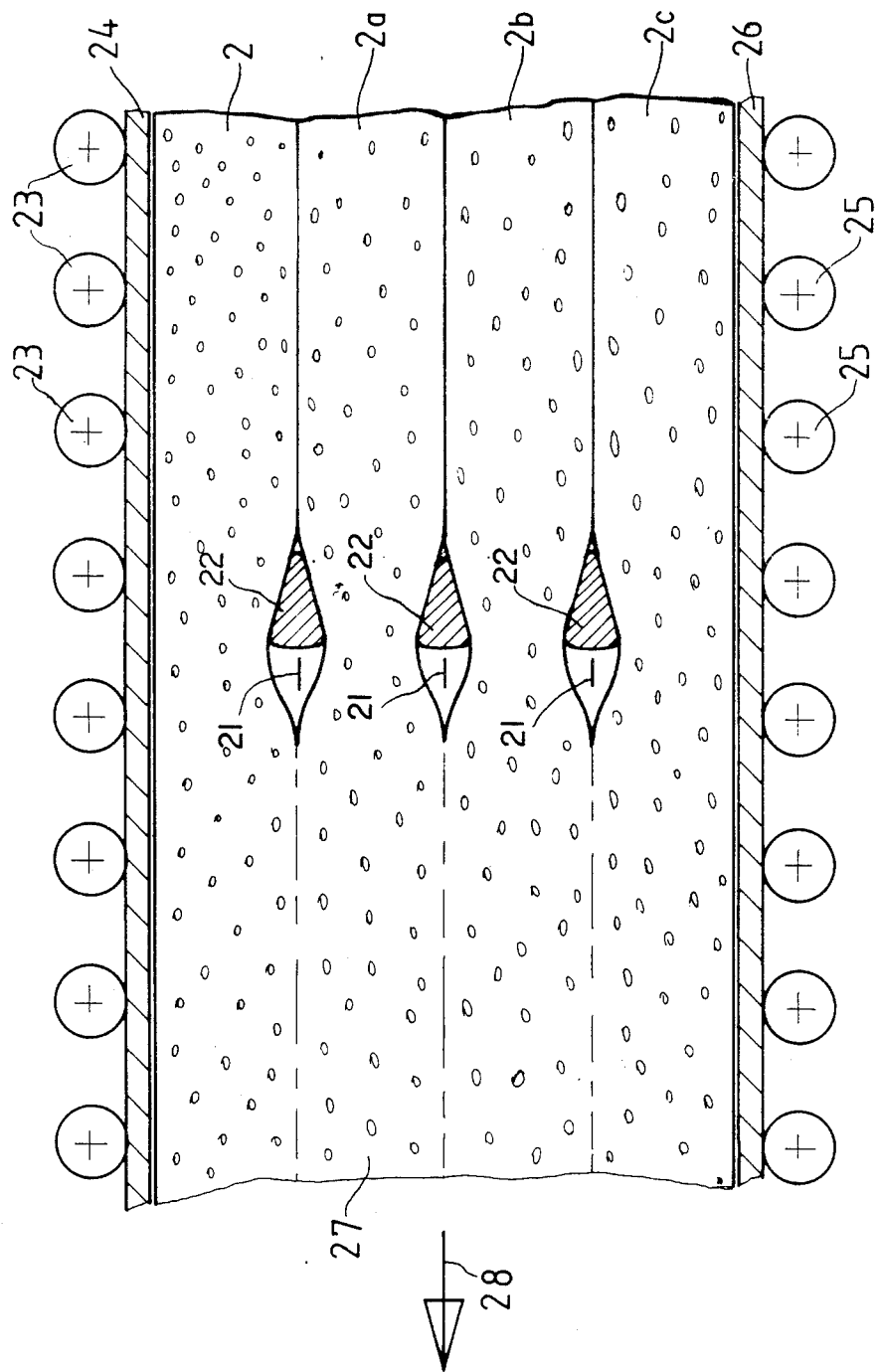

FIG. 46 is a vertical longitudinal section through the welding apparatuses arranged according to the invention in a twin belt system for welding together the tube panels 2, 2a, 2b and 2c.

Figure 47:
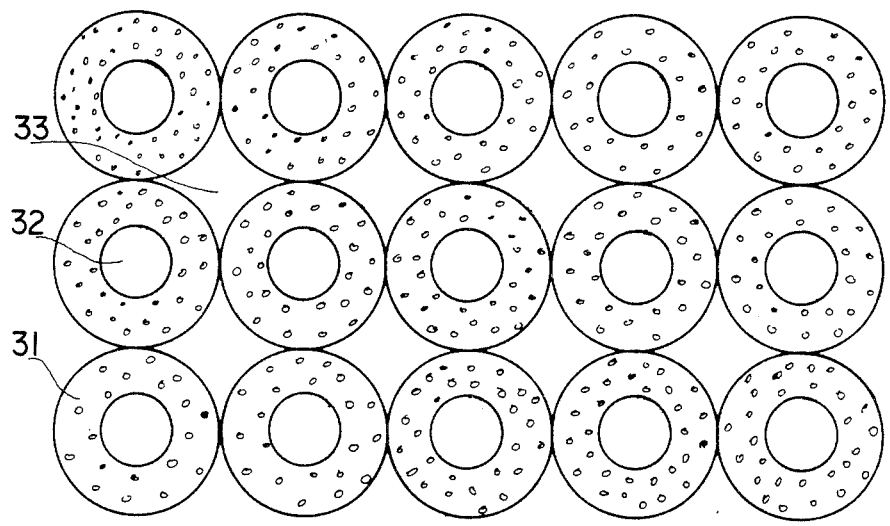

FIG. 47 is a plan view of a super-lightweight panel with holes 32, 33 obtained when a block according to the invention composed of round foam tubes is cut vertically normal to the longitudinal axes of the foam tubes into panels of desired thickness.

Figure 48:
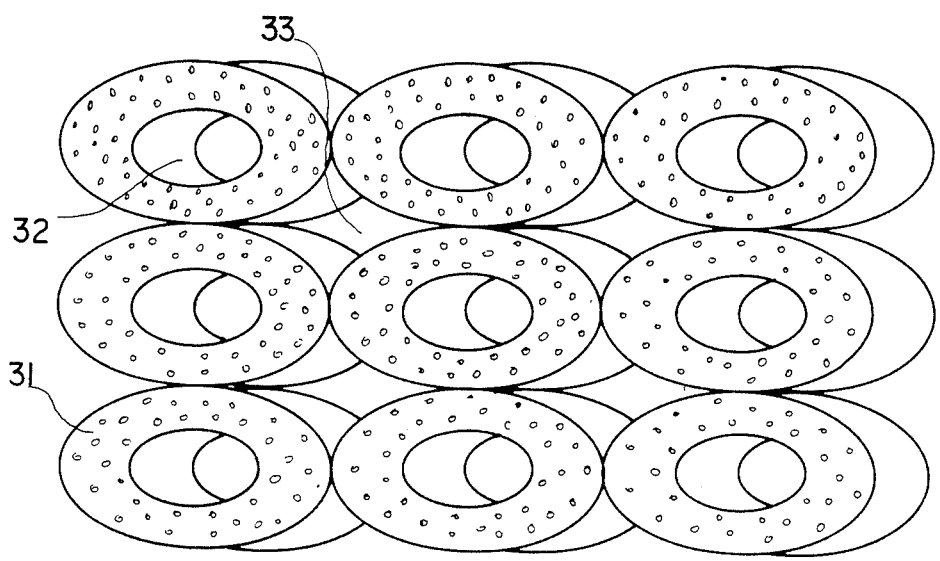

FIG. 48 is a plan view of a super-lightweight panel with oval holes 32 and extended holes 33 obtained when a block of round foam tubes according to the invention is cut vertically, but at an angle of about 45' with respect to the longitudinal axes of the foam tubes, into panels of desired thickness.

According to the invention, the hollow profiles and the tube panels are welded together, and the edge profile bars and individual tubes are welded to these structures preferably in a process which is characterized in that the synthetic resin surfaces to be heated up to melting temperature are guided over a spacing means at a distance around the electrically heated heat conductor serving as heat source in such a way that the synthetic resin surfaces to be welded, together with the spacer means, form a heating channel surrounding the heat source, and said heating channel can optionally be closed at its forward and rearward end. To carry out this process an apparatus is used which is characterized in that it comprises at least one electrically heatable heat source, a spacer means provided in front of each of said heat source(s), and a means for pressing the superficially molten surfaces together.

The materials to be welded together according to the present invention may consist of any desired thermoplastic synthetic resin. However, the process of the invention is preferably carried out with thermoplastic synthetic resin materials that can be bonded together only insufficiently by adhesives or by solution welding, i.e., for example, polyolefins, such as polyethylene, especially low-density polyethylene in the form of foams preferably of a density of less than 50 kg/cm$^3$, especially less than 20 kg/m$^3$.

The apparatus serving to carry out the process of the invention essentially consists of a heat source, a spacer means arranged in front thereof, and a means, arranged downstream of the heat source, for pressing the superficially molten surfaces together. The heat source preferably consists of an electrically heatable heat conductor, especially in the form of a wire or metal strip. Preferably the wire or the metal strip consists of a chromium-nickel alloy, a chromium-nickel-aluminum alloy, or an iron-chromium-nickel alloy. Of course, also all other metals or metal alloys, or non-metallic heat conductors, e.g. silicon carbide heat conductors, may be employed which are commonly used as resistance heating means. The temperature to which the heat conductor is heated varies within a wide range, e.g. from 600° to 1200° C., and depends on the material to be welded and the speed at which the synthetic resin surfaces are guided past the heat conductor. At high speeds of travel and/or with high-melting thermoplastic synthetic resins it may be advantageous or necessary to arrange two or more heat conductors in series in the direction of travel of the synthetic resin surfaces to be welded together. In order to avoid sagging of the heat conductors, and thus non-uniform heat radiation, it is preferred according to the invention to always hold the heat conductors taut, especially when in the form of wires or metal strip, also when they are hot. The tensioning means, which preferably also serves as power supply connector, favorably utilizes the elastic force of a tension or compression spring. According to a preferred embodiment, the power supply can be controlled or regulated by means of a thermocouple provided in the vicinity of the heat conductor.

In order to form a heating channel, and in order to guide the synthetic resin surfaces to be welded together past the heat conductor at a certain distance from and out of direct contact with said heat conductor, a spacer means is provided shortly ahead of the heat conductor. Said spacer means preferably is wedge-shaped and so arranged that the sharp edge of the wedge is oriented towards the oncoming material, while the back of the wedge faces the heat conductor. The length of the wedge and of the heat conductor depends on the width of the areas to be welded together. The sharp edge of the wedge is preferably slightly rounded in order not to hurt the oncoming material. The wedge back is preferably of convex shape and its longitudinal edges are likewise rounded in order to avoid damage to the material. Of course, the back of the wedge may also be of concave shape; in that case the lateral edges are preferably rounded, too. Since this spacer wedge at the same time serves as a heat shield, it may be suitable to provide the spacer wedge with one or more bores or passages in longitudinal direction to provide a possibility of passing coolant medium through the spacer wedge in case the spacer wedge is in danger of overheating if it is in operation for extended periods of time. For special uses, e.g. when a heating channel substantially closed on all sides is desired, the open space downstream of the spacer wedge can be covered on both sides by a cover extending from the wedge. The wedge flanks are preferably highly polished in order to reduce friction.

According to another embodiment of the invention the spacer means can also be a pair of rolls, and in that case the roll diameter and the roll length must be adapted to the prevailing practical requirements. Pairs of spacer rolls are preferably used according to the present invention in cases where, for example, relatively thick and wide tube panels 2, 2a, e.g. panels of a thickness of 8 or 16 cm and a width of one meter or more, are to be welded together, or in cases where the foam panels of the invention are to be laminated with corresponding homogeneous or foamed film or sheets or other facing layers, in order to minimize friction between the foam panels and the spacer means. Also with the use of pairs of spacer rolls preferably supported in ball bearings it may be desirable to cool the rolls. In such cases at least one of the two rolls is hollow and is so constructed that a coolant medium can be passed therethrough.

Hence, by the spacer means it is possible to guide the synthetic resin surfaces to be welded together at a distance past the heat source to thereby superficially melt the synthetic resin surfaces.

Shortly after having passed by the heat source the molten surfaces are compressed by means of suitable devices, e.g. by pressure rolls. After the material has cooled down the welding operation is terminated.

According to the present invention, foam tubes made of low-density polyethylene having volume weights of less than 50 kg/m$^3$ or 20 kg/m$^3$, respectively, can be welded together to form panels of any desired width. The width of the tube areas which are welded together can be varied by accordingly compressing the foam tubes, e.g. by varying the distance between the juxtaposed welding means of the invention, the dimensions of the spacer means, and the nip between the pressure rolls which may be provided downstream of the heat source. Since the welding means of the invention can be arranged not only side by side but also one above the other, the foam tubes can be simultaneously welded together side by side and one above the other by means of such a lattice welding system, so that the panels or blocks composed of the foam tubes are obtained.

Furthermore, according to the present invention it is possible in a continuous mode of operation, for example with a twin belt system in which the welding means of the invention is integrated, to produce sandwich elements having a polyethylene foam core which otherwise can be adhesion-bonded only with difficulty (if at all) and metallic or other facing layers to which the molten polyethylene firmly adheres.

According to the present invention, the foam tubes are welded together by the mode of operation illustrated by FIGS. 42 to 44. At the frame 29 assembled, for example, from steel tubing (cf. FIGS. 42 and 44) the wedge-shaped spacer means 22 are disposed in vertical arrangement (see FIG. 42) and in FIG. 44 additionally in horizontal arrangement, with their wedge blades visible in FIGS. 42 and 44. In the middle behind the wedge-shaped spacer means the associated heat conductors 21 are arranged (see FIGS. 43 and 45) which are always held taut by means of spring tensioning devices, not shown. The spaces between the wedge-shaped spacer means 22 and the lateral confining bars 30, whose distance from one another decreases somewhat in the direction of travel, are preferably so selected that the foam tubes, after having travelled past the welding means, fuse together over a wide area. In order to exert additional pressure on the superficially molten tube walls there is preferably provided, shortly behind the welding means and across, i.e. normal to the direction of travel, a pair of rolls whose rolls are spaced apart from each other and between which the foam tubes are guided.

As shown in FIG. 42, a plurality of welding apparatuses can be arranged side by side so that 20 foam tubes, for example, can be easily welded together to form a tube panel 2. The same applies to the "lattice system" illustrated by FIG. 44 by which a plurality of tubes disposed side by side and one above the other can be simultaneously welded together, for example to form a square block. In view of practical considerations, however, it may be advantageous to simultaneously weld together 10 or 20 foam tubes disposed side by side, as shown in FIG. 42, and thereafter to weld the thus obtained tube panels 2, 2a, 2b etc one above the other, as shown in FIG. 44, without the vertically arranged welding means, or with the use of the twin belt system shown in FIG. 46 which will be described hereafter.

FIG. 46 is a vertical longitudinal section through part of a twin belt system with upper conveyor belt 24 guided along rolls 23 and lower conveyor belt 26 guided along rolls 25. Between the upper and the lower conveyor belt 24, 26 there are four layers of tubes 2, 2a, 2b and 2c to be welded together which, after having moved past the wedge-shaped spacer means 22 and the electrically heated heat conductors 21, are welded together to form a foam panel 27. The arrow 28 indicates the direction of travel. Depending on the desired thickness of the welded panels or blocks, several welding apparatuses of the invention can be disposed one above the other or step-wise one after the other in additionally provided corresponding systems. Of course, it is also possible to so design the system that only one welding apparatus is provided, and in that case only two tube panels 2, 2a can be welded together to form the accordingly thicker panel. Moreover, with an accordingly designed system tube panels of different thicknesses can be welded together. The twin belt system can be laterally open, or it can be closed by two additional corresponding conveyor belts likewise moving over rolls. The additional lateral conveyor belts will be provided if lateral evasion of the foam material is to be avoided and thus the pressure for compressing the superficially molten surfaces is to be increased. Normally, i.e. also without lateral conveyor belts, the tube panels—even shortly after the introduction thereof into the twin belt system—are already subject to such high pressure that, owing to their flexibility, they are sufficiently compressed by their own expansion, after having travelled past the welding means.

The foam panels and blocks according to the invention can also be produced by direct extrusion welding. In this continuous process the foamable synthetic resin, preferably polyethylene, is extruded with propellant through suitable nozzles and is allowed to freely foam in the air to form a foam tube. When in this process a multiplicity of nozzles are arranged side by side and/or one above the other in such a way that the foaming tubes contact each other, which happens already very shortly after extrusion through the nozzle, and if care is taken that they are additionally pressed one against the other, for example by suitably arranged pairs of rolls, one obtains the desired foam panels and blocks "in one step". The welding effect can optionally be enhanced by installation of additional heating means directly downstream of the nozzle orifices in order to remelt any external tube skin that may have developed during foaming. Such heating means can be electrically heated wire or metal strip, or devices emitting hot air.

The foam panels welded together in any one of the modes described above are then cut to the desired length so that the cut made, for example, with a hot wire is performed such that the desired edge profile is obtained already when the material is cut to size; in this way no waste is produced because the matching counterpart is obtained automatically.

In case the cutting operation in connection with a desired type of edge profile meets with difficulties, the corresponding profile bars can be cut in a simple manner and so that no waste is produced. The profile bars are then welded to the base panel, which may consist of one or two foam tube panels 2, 2a, for example, by means of the above described welding technique, for example.

The foam panels according to the invention are primarily used for thermal insulation in the building industry, especially for application in the spaces of external walls consisting of the supporting wall proper and the curtain wall provided some distance before the supporting wall, for application between the rafters as roof insulation panels, as cast plaster floor insulating panels, and as thermally insulating drainage panels underneath foundations, and as external insulation for underground brickwork.

The foam panels of the invention obtainable according to the invention in a simple way and in any desired density, when used as thermal insulation panels installed in the space between external wall and curtain wall, exhibit the following advantages, inter alia;

(1) The foam can be adjusted to meet existing fire protection regulations.
(2) The lambda values can be adjusted between 0.025 and 0.050, as desired, and depending on the combination and fabrication of the elements, which may range from highly flexible to rigid.
(3) The installation by the mason is simple and foolproof. The panels do not rot.
(4) The foam panels are of light weight and are obtainable at low cost.
(5) The insulation value of vertical and/or horizontal columns having a lambda value of 0.0204 at 0° C. is utilized.
(6) They keep the interior-exterior walls "sound" by air columns (condensation balance; "breathing").
(7) They are not sensitive to shaking and vibration; they improve air-borne sound absorption; do not form cold paths; can be cut also at corners; are immune to moisture (pick-up ±0% $H_2O$).

In a likewise preferred embodiment of the invention the foam blocks produced according to the invention can, in turn, be cut into foam panels having super-light volume weight, namely when cut off the block normal to the longitudinal axes of the tubes, or at any other angle with respect to the longitudinal axes of the tubes.

Such panels are used for the manufacture of quite a number of products, e.g. of gymnastics mats, of high jump cushions, of sandwich elements for sound absorption etc. For this purpose the super-lightweight panels may be used as core and may be laminated with foam or provided with other facing layers. Moreover, super-lightweight composite panels can be produced by alternately welding the super-lightweight panels and solid foam panels.

For the core function also two or more super-lightweight panels can be welded together to again form thicker superlightweight panels by means of the welding apparatus of the invention, namely such that the super-lightweight panels are superposed in such a way that the holes of one super-lightweight panel are covered by the foam areas of the overlying super-lightweight panel, which can be realized by accordingly dimensioning the initial foam tubes and optionally also by using, for the manufacture of the super-lightweight panels, foam blocks in which the tube panels are stacked in the manner of the foam panel of FIG. 22.

When in the super-lightweight panels the holes or recesses resulting from the foam tube interiors and interstices between the foam tubes are filled with gypsum, cement or other material, and two or more of such panels, in turn, are welded together in mutually offset relationship, excellent sound-absorbent panels are obtained, because the materials contained in the holes or recesses are quasi suspended in the "foam skeleton" of the panels, and the sonic energy is converted to mechanical oscillations of the gypsum or cement plugs.

The super-lightweight panels of the invention are further explained by the additional FIGS. 47 and 48, without being thereby limited.

What is claimed is:

1. A block comprising a panel formed of a plurality of hollow profiles formed of synthetic resin foam material, which profiles are adhered or welded to one another.

2. A block according to claim 1, wherein the profiles are in the form of hollow foam tubes which are adhered or welded to each other.

3. A block according to claim 2, wherein the foam tubes which form the panel are arranged side by side, parallel to each other.

4. A block according to claim 3, wherein the block comprises a plurality of panels formed in parallel layers one above the other.

5. A block according to claim 4, wherein the tubes of each panel of the block extend parallel to the tubes of the other panel or panels of the block.

6. A block according to claim 5, wherein the axes of the tubes in all panels of the block are disposed one above the other in a vertical plane.

7. A block according to claim 5, wherein the axes of the tubes in each panel are offset laterally from the axes of the tubes in the adjacent panels, such that the axes of the tubes in each panel are above and below the location of the adherence or weld of the tubes of the panels above and below that panel.

8. A block according to claim 2, wherein the tubes are of rectangular cross-section and extend parallel to one of the edges of the panel.

9. A block according to claim 2, wherein at least one end of the hollow tubes is sealed closed with a layer of material.

10. A block according to claim 2, wherein a first one of the opposed edges of that panel formed by the open tube ends comprises a shaped portion such as a step, wedge or the like, and the opposite edge of the panel comprises a mating portion, such that the said first edge will mate with an edge of a similar panel which edge corresponds to said opposite edge.

11. A block according to claim 10, wherein both ends of the panel are closed by a layer of material, and said shaped and mating portions are formed in said layers of material.

12. A block according to claim 10, wherein the said shaped and mating portions are formed on and into the tube ends themselves.

13. A block according to claim 2, wherein the opposed edges of the panel formed by the sides of the outermost tubes of the panel are shaped to mate with an adjacent panel.

14. A block according to claim 13, wherein the outermost tubes of each panel are specially shaped to mate with each other, such that a first outermost edge of each panel will mate with a second edge of a similar adjacent panel, which second edge corresponds to the opposite edge of the first said panel.

15. A block according to claim 14, wherein the first outermost edge is shaped to form a projection, and the second edge is cut out to matingly receive that projection.

16. A block according to claim 14, wherein the tubes forming both said first and second outermost edges are cut out identically to each other such that the first edge of one panel will interlockingly mate with the second edge of a similar adjacent panel.

17. A block according to claim 13, wherein the block comprises a plurality of panels formed in parallel layers, one above the other, the axes of all the tubes in the block being parallel to each other, and wherein along a first edge of the block the layers are staggered such that the sides of the end tubes of the respective layers form a step, wedge, tube or the like, and along the opposite edge of the block the sides of the end tubes form a shape which mates with the shape of the first edge.

18. A block according to claim 2, wherein the block comprises a pair of panels arranged with the open tube ends of one panel abutting the open tube ends of the other panel, and wherein the remote ends of the said pair of panels form shaped portions which mate with each other, a first end having the shape of wedges, steps, or the like, and the opposite end of the pair having a complementary shaped portion.

19. A block according to claim 9, wherein the layer of material closing the ends of the tubes are adhered to the interior walls of the tubes.

20. A block according to claim 19, wherein the layers of material closing the ends of the tubes are of stiffer material than the tubes themselves, and are shaped to join its respective panel to an adjacent similarly shaped panel.

21. A block according to claim 2, including a rigid film sheet overlying the tubes on at least one face of the panel.

22. A block according to claim 2, including a foamed cover layer covering at least one face of the panel.

23. A block according to claim 2, comprising a plurality of panels formed in parallel layers, one above the other, and including a foamed interlayer between the two panels.

24. A block according to claim 23, including a rigid film sheet overlying at least one face of the block.

25. A block according to claim 2, wherein at least some of the individual tubes have spacers on at least one panel face.

26. A block according to claim 25, wherein the spacers are formed by selected ones of said hollow tubes which are of larger cross-section than the remaining tubes of that panel and spaced at intervals along the panel such that they project out from the other tubes along at least one face of the panel.

27. A block according to claim 26, wherein the tubes are cylindrical and said selected ones are of larger diameter than the remaining tubes of the panel and project out beyond the plane formed by the other tubes of the panel.

28. A block according to claim 25, wherein the spacers are formed by thin elastic round rods extending along at least one face of the panel.

29. A block according to claim 25, wherein the spacers are formed by profiled bars welded to at least some of the tubes of projecting out from the panel faces.

30. A block according to claim 2, wherein the hollow tubes consist of polyethylene, preferably low density polyethylene.

31. A block according to claim 23, wherein the foamed interlayer consists of polyurethane or polystyrene.

32. A block according to claim 2, wherein the hollow cavities of the hollow foamed tubes are filled with foams of a different material such as foam pellets, foam chips, gypsum, cement or rods of rigid, elastic foamed or non-foamed materials.

33. A block according to claim 32, wherein the block comprises a plurality of panels formed in parallel layers, one above the other, and wherein the closed spaces formed in the block between adjacent tubes is also filled with materials other than the material of the tube.

34. A block according to claim 2, wherein the block comprises a plurality of panels formed in parallel layers, one above the other, and the tubes of one panel are perpendicular to the tubes of an adjacent panel of the block.

35. A block according to claim 2, wherein the block comprises a plurality of panels formed in parallel layers, one above the other, the tubes of each panel of the block extending parallel to the tubes of the other panels of the block, and including at one end of the block adjacent the sides of the tubes at that end a rigid block which is shaped to mate with the end tubes of an adjacent, similarly shaped block.

36. A block according to claim 2, in combination with a building structure, said block being located between roof, ceiling, wall or floor layers to provide insulation.

37. A block according to claim 2, in combination with a building structure, underneath the building foundation or as external insulation for underground brickwork, and said tubes comprising drainage openings.

38. A block according to claim 2, wherein the block comprises a plurality of panels formed in parallel layers, one above the other, in combination with a building structure, as a thick sound-absorbant block.

* * * * *